(12) United States Patent
Pafumi et al.

(10) Patent No.: US 9,031,917 B2
(45) Date of Patent: *May 12, 2015

(54) EFFICIENT BACKUP AND RESTORE OF VIRTUAL INPUT/OUTPUT SERVER (VIOS) CLUSTER

(75) Inventors: James A. Pafumi, Leander, TX (US); Chintamani P. Siddeshwar, Karwar (IN); Rupesh Kumar Thota, Bangalore (IN); Vasu Vallabhaneni, Austin, TX (US)

(73) Assignee: International Buisness Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/621,217

(22) Filed: Sep. 15, 2012

(65) Prior Publication Data
US 2013/0013569 A1     Jan. 10, 2013

Related U.S. Application Data

(63) Continuation of application No. 12/963,809, filed on Dec. 9, 2010, now Pat. No. 8,392,378.

(51) Int. Cl.
*G06F 7/00* (2006.01)
*G06F 17/00* (2006.01)
(Continued)

(52) U.S. Cl.
CPC ........ *G06F 11/2023* (2013.01); *G06F 11/1654* (2013.01); *G06F 17/30085* (2013.01); *G06F 11/1451* (2013.01); *G06F 11/1658* (2013.01);
(Continued)

(58) Field of Classification Search
CPC .......... G06F 17/30067; G06F 11/1469; G06F 2201/84; G06F 3/0601; G06F 11/1458; G06F 17/30117; G06F 17/3015; G06F 11/1402; G06F 11/1654

USPC .......................................................... 707/679
See application file for complete search history.

(56) References Cited

U.S. PATENT DOCUMENTS 6,748,429 B1    6/2004  Talluri
6,785,786 B1 *  8/2004  Gold et al. .................... 711/162
(Continued)

OTHER PUBLICATIONS

U.S. Appl. No. 12/963,809, entitled "Efficient Backup and Restore of Virtual Input/Output Server (VIOS) Cluster": Notice of Allowance dated Oct. 30, 2012 (21 pg.).

*Primary Examiner* — James Trujillo
*Assistant Examiner* — Jessica N Le
(74) *Attorney, Agent, or Firm* — Yudell Isidore PLLC; Matthew Baca

(57) ABSTRACT

A method enables cluster-level backup and restore functionality of all Virtual Input/Output Server (VIOS) configuration data within a VIOS cluster and the data of a shared VIOS cluster database. The method comprises: performing, via a backup/restore utility of a VIOS partition, a cluster level backup, which creates a first VIOS cluster configuration backup file having configuration information about hardware, logical and virtual devices of each VIOS partition within a VIOS cluster and all cluster data from the shared VIOS database of the VIOS cluster; storing the VIOS cluster configuration backup file within a storage location; and responsive to receipt of a VIOS restore command at a VIOS partition: retrieving the configuration backup file from the storage location; restoring a configuration of the hardware, logical and virtual devices of each VIOS within the VIOS cluster to prior state; and restoring the shared VIOS database with the backed-up cluster data.

7 Claims, 11 Drawing Sheets

(51) Int. Cl.
*G06F 11/20* (2006.01)
*G06F 17/30* (2006.01)
*G06F 11/16* (2006.01)
*G06F 11/14* (2006.01)

(52) U.S. Cl.
CPC ......... *G06F 11/2038* (2013.01); *G06F 11/2046* (2013.01)

(56) References Cited

U.S. PATENT DOCUMENTS

| | | |
|---|---|---|
| 7,433,300 B1 | 10/2008 | Bennett |
| 8,402,228 B2 * | 3/2013 | Anand et al. ............... 711/147 |
| 8,661,428 B2 * | 2/2014 | Clark ............................ 717/170 |
| 8,726,274 B2 * | 5/2014 | Pafumi et al. ..................... 718/1 |
| 2006/0123024 A1 | 6/2006 | Sathayanarayan |
| 2007/0077034 A1 * | 4/2007 | Okuyama et al. ............ 386/112 |
| 2008/0189468 A1 | 8/2008 | Schmidt |
| 2008/0294773 A1 * | 11/2008 | Pafumi et al. ................ 709/225 |
| 2009/0094355 A1 * | 4/2009 | Johnson et al. ............... 709/223 |
| 2009/0150510 A1 * | 6/2009 | Kovacs et al. ................ 709/213 |
| 2009/0210872 A1 * | 8/2009 | Dai et al. ........................... 718/1 |
| 2009/0222496 A1 | 9/2009 | Liu |
| 2009/0276551 A1 * | 11/2009 | Brown et al. ................... 710/72 |
| 2011/0087912 A1 * | 4/2011 | Dickson ......................... 713/324 |
| 2012/0110274 A1 * | 5/2012 | Rosales et al. ............... 711/153 |

\* cited by examiner

EFFICIENT BACKUP AND RESTORE OF VIRTUAL INPUT/OUTPUT SERVER (VIOS) CLUSTER

PRIORITY CLAIM

The present application is a continuation of and claims priority from U.S. patent application Ser. No. 12/963,809, filed on Dec. 9, 2010, titled "Efficient Backup and Restore of Virtual Input/Output Server (VIOS) Cluster," which is incorporated by reference herein in its entirety and for all purposes.

BACKGROUND

1. Technical Field

The present invention relates in general to distributed data processing systems and in particular to distributed data processing systems with cluster-aware virtual input/output servers (VIOSes). Still more particularly, the present invention relates to a method, data processing system and computer program product for efficient backup and restore operations within a VIOS cluster environment.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. Within a storage virtualization environment, one or more virtual input/output servers (VIOSes) can be provided for handling I/O operations of the virtualized client logical partitions (LPARs). Currently, backup and restoration processes performed on such systems are individualized, manually driven and very time consuming.

BRIEF SUMMARY

Disclosed are a method, data processing system and computer program product that enables a cluster level backup and restore functionality of configuration data of each Virtual Input/Output Server (VIOS) within a VIOS cluster, including a backup of the VIOS cluster database. The method comprises the functional features of: performing, via a backup/restore utility of a cluster aware (CA) operating system (OS) executing on a processor resource of the first VIOS partition, a cluster level backup operation from one or more VIOS partitions, including the first VIOS partition and at least one second VIOS partition, wherein the cluster level backup operation creates a first VIOS cluster configuration backup file having configuration information about hardware, logical and virtual devices of each VIOS partition within a VIOS cluster and all cluster data from a shared VIOS database of the VIOS cluster; storing the VIOS cluster configuration backup file within a storage location; and responsive to receipt of a VIOS restore command at the first VIOS partition: retrieving the configuration backup file from the storage location; restoring a configuration of the hardware, logical and virtual devices of the first VIOS to a state that existed at a time at which the backup operation creating the configuration backup file was performed; triggering a restore operation of each second VIOS within the VIOS cluster; and restoring the shared VIOS database with the cluster data from the VIOS cluster configuration backup file.

In one or more embodiments, performing the cluster level backup operation from the first VIOS partition can further comprise: performing a local configuration backup of configuration data of the first VIOS to generate a first XML configuration file; forwarding the first XML configuration file to a collating storage location; messaging each second VIOS within the VIOS cluster to perform a local configuration backup and to return a respective second XML configuration file to a single collating storage location; performing a complete backup of the shared VIOS database to generate a VIOS data base backup file; forwarding the VIOS database backup file to the collating storage location; generating the single VIOS cluster configuration backup file from the N XML configuration files of each VIOS within the VIOS cluster and the one (1) VIOS database backup file, wherein the generating comprises performing a zip operation to collate and compress the N XML configuration files and the VIOS database backup file into a single zip file; and storing the single zip file as the VIOS cluster configuration backup file.

In one embodiment, the storing of the VIOS cluster configuration backup file comprises one or more of: storing a local copy of the VIOS cluster configuration backup file at a local storage of the first VIOS; storing a local copy of the VIOS cluster configuration backup file at a local storage of each of the first VIOS and the one or more second VIOSes; and storing an exportable copy of the VIOS cluster configuration backup file at one or more of the shared storage repository and the VIOS database.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
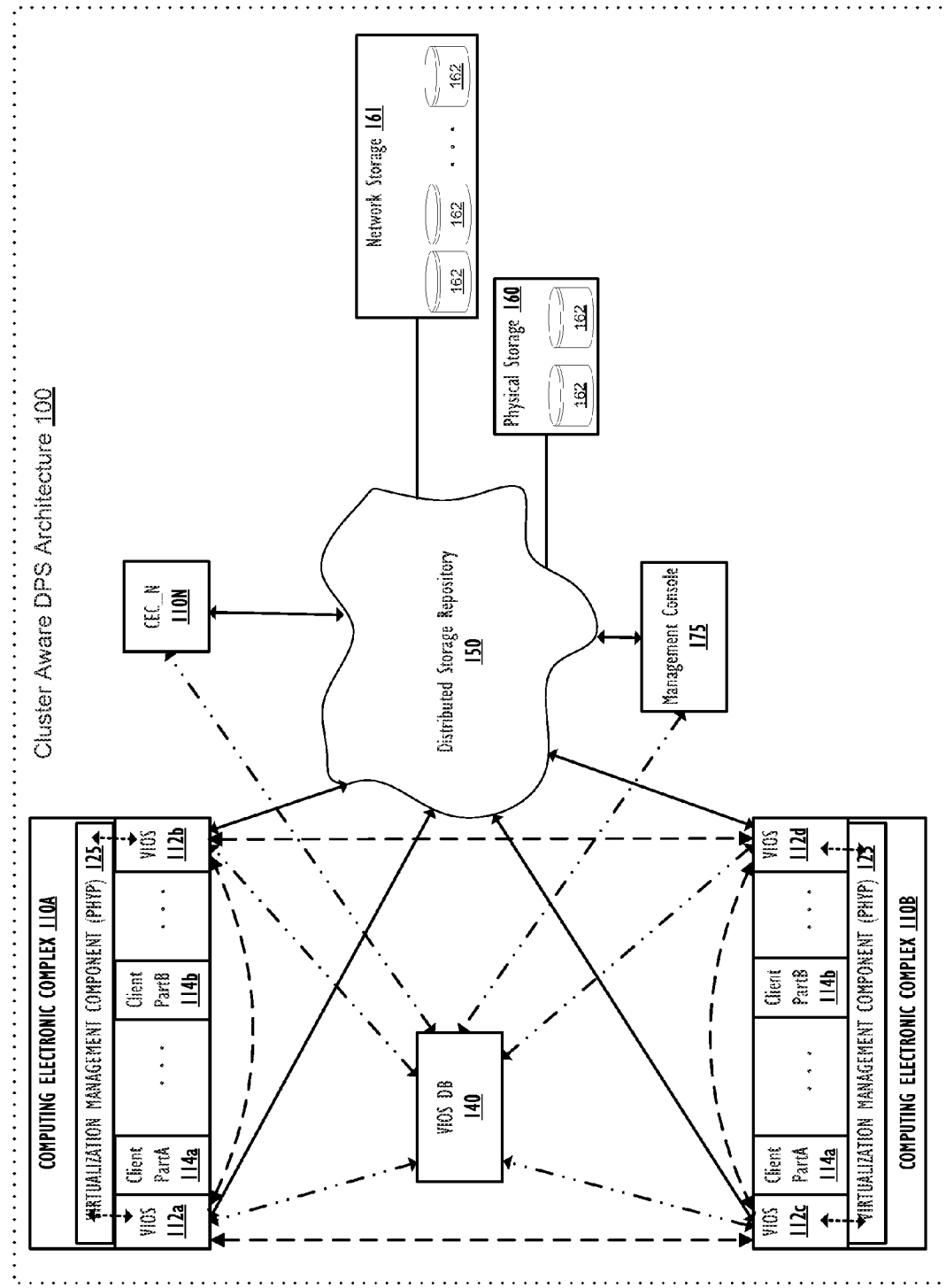
FIG. 1A illustrates a first view of a cluster (aware) data processing system within which various of the functional features of the described embodiments are implemented, according to one embodiment.

The illustrative embodiments provide a method, data processing system, and computer program product that enable efficient backup and restore operations of a Virtual Input/Output (I/O) Server (VIOS) cluster, including all Virtual Input/Output Server (VIOS) configuration data within a VIOS cluster and the data of a shared VIOS cluster database. In a first VIOS partition, the method provides: performing, via a backup/restore utility of a VIOS partition, a cluster level backup, which creates a first VIOS cluster configuration backup file having configuration information about hardware, logical and virtual devices of each VIOS partition within a VIOS cluster and all cluster data from the shared VIOS database of the VIOS cluster; storing the VIOS cluster configuration backup file within a storage location; and responsive to receipt of a VIOS restore command at a VIOS partition: retrieving the configuration backup file from the storage location; restoring a configuration of the hardware, logical and virtual devices of each VIOS within the VIOS cluster to prior state; and restoring the shared VIOS database with the backed-up cluster data.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing util-ity/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
   B. Cluster-Aware VIOS
   C. VIOS Shared DB for Cluster Management
   D. VIOS Backup and Restore
      D1. Single VIOS Backup
      D2. Single VIOS Restore
   E. Backup and Restore of VIOS Cluster A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
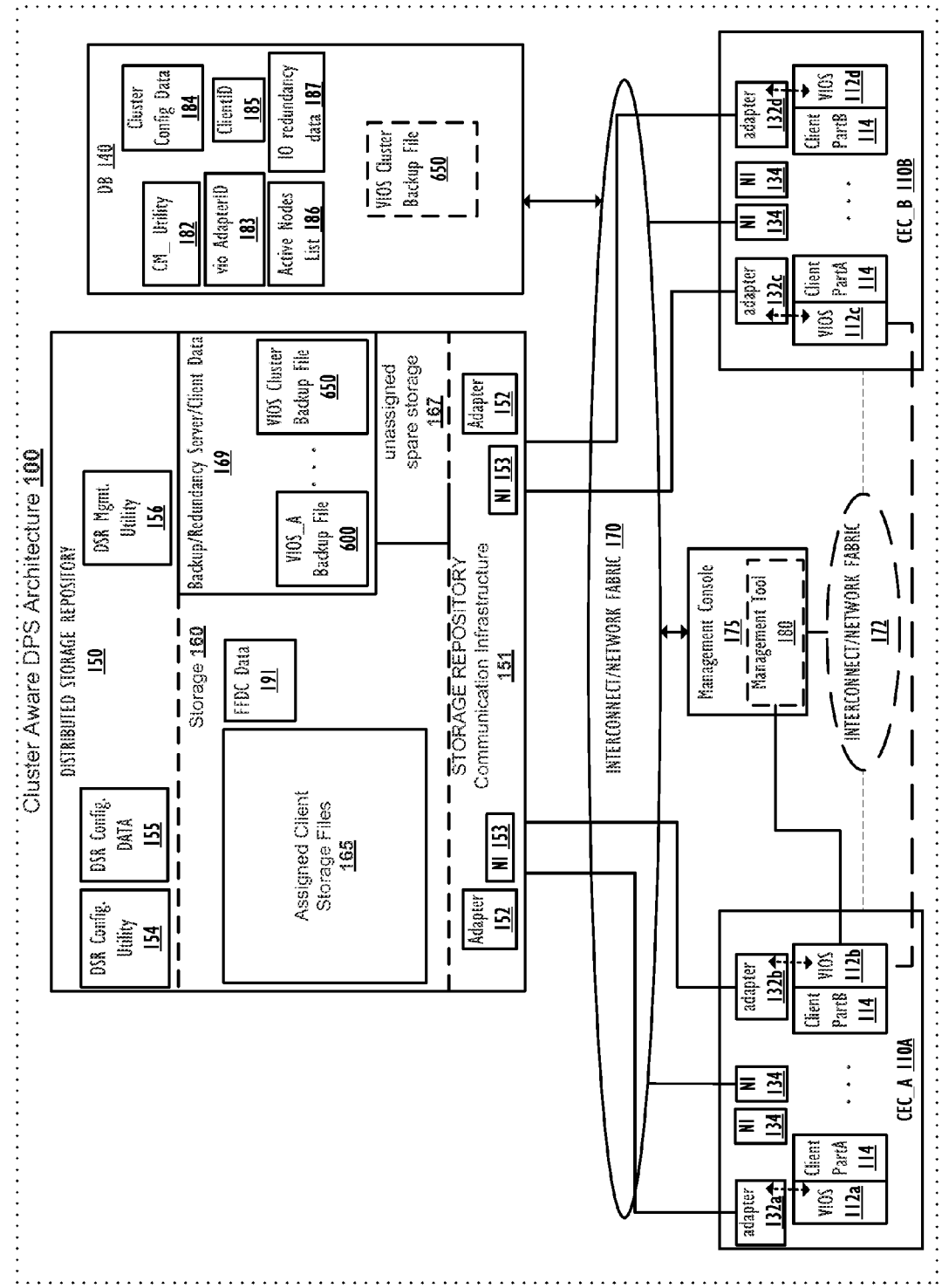
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node_A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Figure 1C:
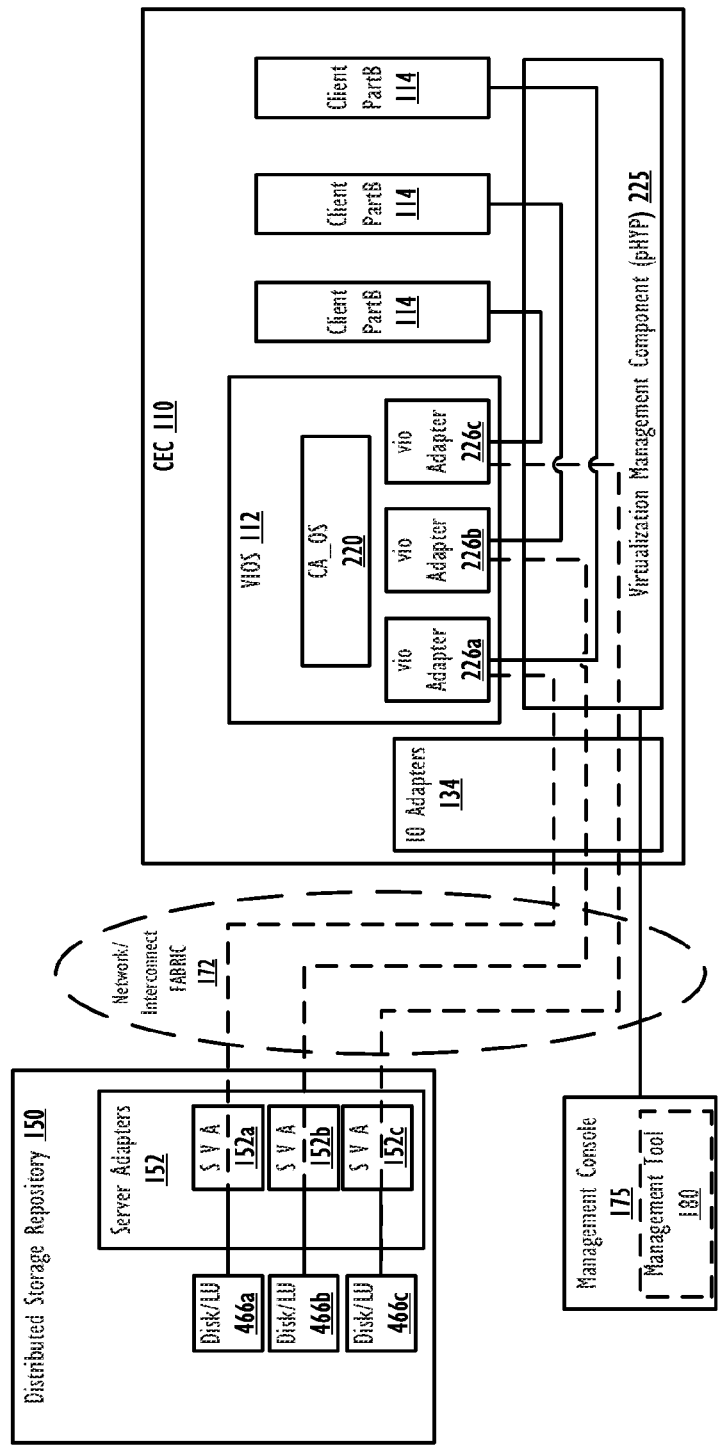
FIG. 1C illustrates a third view of the cluster data processing system (DPS) of FIG. 1A depicting virtual IO connectivity from client logical partitions (LPARs) to assigned client logical units or disks, according to one or more embodiments.

As depicted, each CEC 110 comprises one or more network interfaces 134 and one or more I/O adapters 132 to enable the CEC 110 and thus the other components (i.e., client partitions) of the CEC 110 to engage in network level communication, as illustrated by FIG. 1C. As illustrated within FIG. 1C, within an example virtual I/O architecture 190, each VIOS 112 emulates virtual client I/O adapters 226a-22c to enable communication by specially-assigned client LPARs 114a-114c with distributed storage repository 150 and/or other clients, within the same CEC or on a different CEC. The VIOSes 112 emulate these virtual I/O adapters 226a-226c and communicates with distributed storage repository 150 by connecting with corresponding virtual sever I/O adapters (SVA) 152a-152c at distributed storage repository 150. Internal CEC communication between VIOS 112 and client LPARs 114a-114c are illustrated with solid connecting lines, which are routed through the virtualization management component, while VIOS to server communication is provided by dashed lines, which connect via the network/interconnect fabric 172. Also shown by FIG. 1C is the connection of the management console 175, which is utilized to perform the setup and/or initialization of the backup and restore operations described herein for the individual VIOSes 112 and/or of the VIOS cluster as a whole, in various embodiments. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

Also illustrated by FIG. 1B is an initial view of the component make-up of an example distributed storage repository 150 and an initial listing of some components of DB 140. To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters 152*a-c* (FIG. 1C), which are paired with respective virtual I/O adapters 226*a-c* (via emulation of physical I/O adapters 132) that are assigned to specific clients 114*a*-114*c* of CECs 110.

Figure 3:
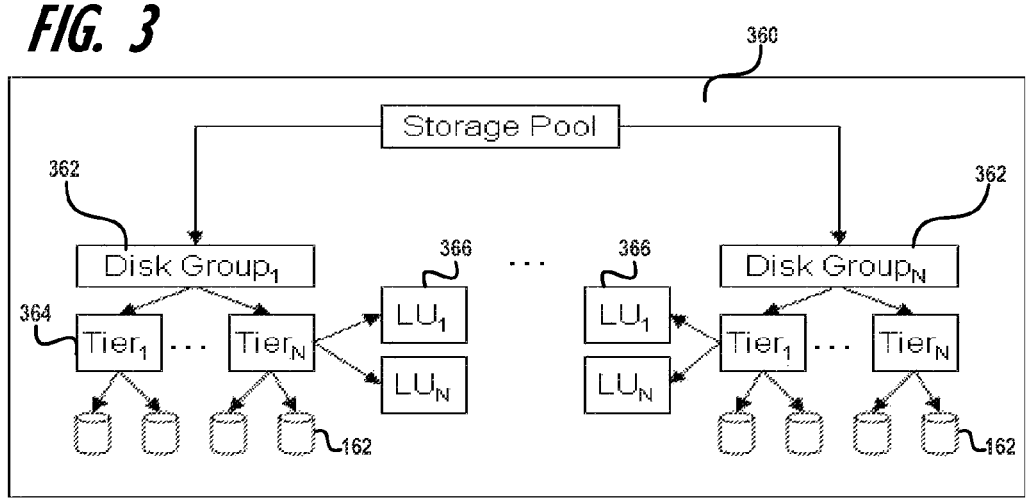
FIG. 3 illustrates an example shared storage pool utilized for storage I/O functions of the VIOSes, according to one embodiment.

As shown, distributed data store 150 generally comprises general storage space 160 (the available local and network storage capacity that may be divided into storage pools) providing assigned client storage 165 (which may be divided into respective storage pools for a group of clients), unassigned, spare storage 167, and backup/redundant CEC/VIOS/client configuration data storage 169. In one embodiment, the assigned client storage is allocated as storage pools, and several of the features related to the sharing of a storage resource, providing secure access to the shared storage, and enabling cluster-level control of the storage among the VIOSes within a cluster are supported with the use of storage pools. When implemented within a VIOS cluster, storage pools provide a method of logically organizing one or more physical volumes for use by the clients supported by the VIOSes making up the VIOS cluster. FIG. 3 illustrates an example configuration of a storage pool utilized within a cluster aware DPS 100. Specifically, FIG. 4A provides details on how these physical volumes are used within the storage pool. As shown, storage pool 360 within the cluster contains one or more Disk Groups 362. Disks Groups 362 provide administrators the ability to provide access policies to a given subset of physical volumes 162 within the storage pool 360. Once a disk group 362 has been defined, administrators can further categorize the subset into Storage Tiers 364 based on disk characteristics. Once a Disk Group 362 and Storage Tier 364 have been defined, administrators carve Logical Units (LU) 366 to be exported to client partitions (114).

With the capability of virtual pooling provided herein, an administrator allocates storage for a pool and deploys multiple VIOSes from that single storage pool. With this implementation, the SAN administration functions is decoupled from the system administration functions, and the system administrator can service customers (specifically clients 114 of customers) or add an additional VIOS if a VIOS is needed to provide data storage service for customers. The storage pool may also be accessible across the cluster, allowing the administrator to manage VIOS work loads by moving the workload to different hardware when necessary. With the cluster aware VIOS implementation of storage pools, additional functionality is provided to enable the VIOSes to control access to various storage pools, such that each client/customer data/information is secure from access by other clients/customers.

Returning now to FIG. 1B, located within backup/redundancy data storage 169 of distributed storage repository (DSR) 150 are one or more VIOS backup files 600 and VIOS Cluster backup file 650. Specific functionality of these two types of backup files and the method by which both file types are created, as well as how the files are utilized to support the restore of one or more VIOSes and/or the VIOS cluster is provided (or described) in greater detail in Section D of the present disclosure. In an alternate embodiment, one or both of the VIOS backup file/s 600 and VIOS cluster backup file 650 can be stored within VIOS DB 140. Regardless of the implementation, both storage locations (190 or 140) are accessible to management tool 180 and enable access by system administrative tools/personnel to the backup file data as needed for completing subsequent restore operations.

As illustrated, DSR 150 further comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, DPS 100 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various presented embodiments.

The various data structures illustrated by the figures and/or described herein are created, maintained and/or updated, and/or deleted by one or more operations of one or more of the processing components/modules described herein. In one embodiment, the initial set up of the storage pools, VIOS DB 140 and corresponding data structures is activated by execution of a cluster aware operating system by management tool 180 and/or one or more VIOSes 112. Once the infrastructure has been established, however, maintenance of the infrastructure, including expanding the number of nodes, where required, is performed by the VIOSes 112 in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster. In one embodiment, management tool 180 registers with a single VIOS 112b and is thus able to retrieve/receive cluster-level data from VIOS, including FFDC data (191) of the entire cluster. In one implementation, the management tool 180 registers with a primary node of the cluster, as defined in greater details in Section D below.

Figure 2:
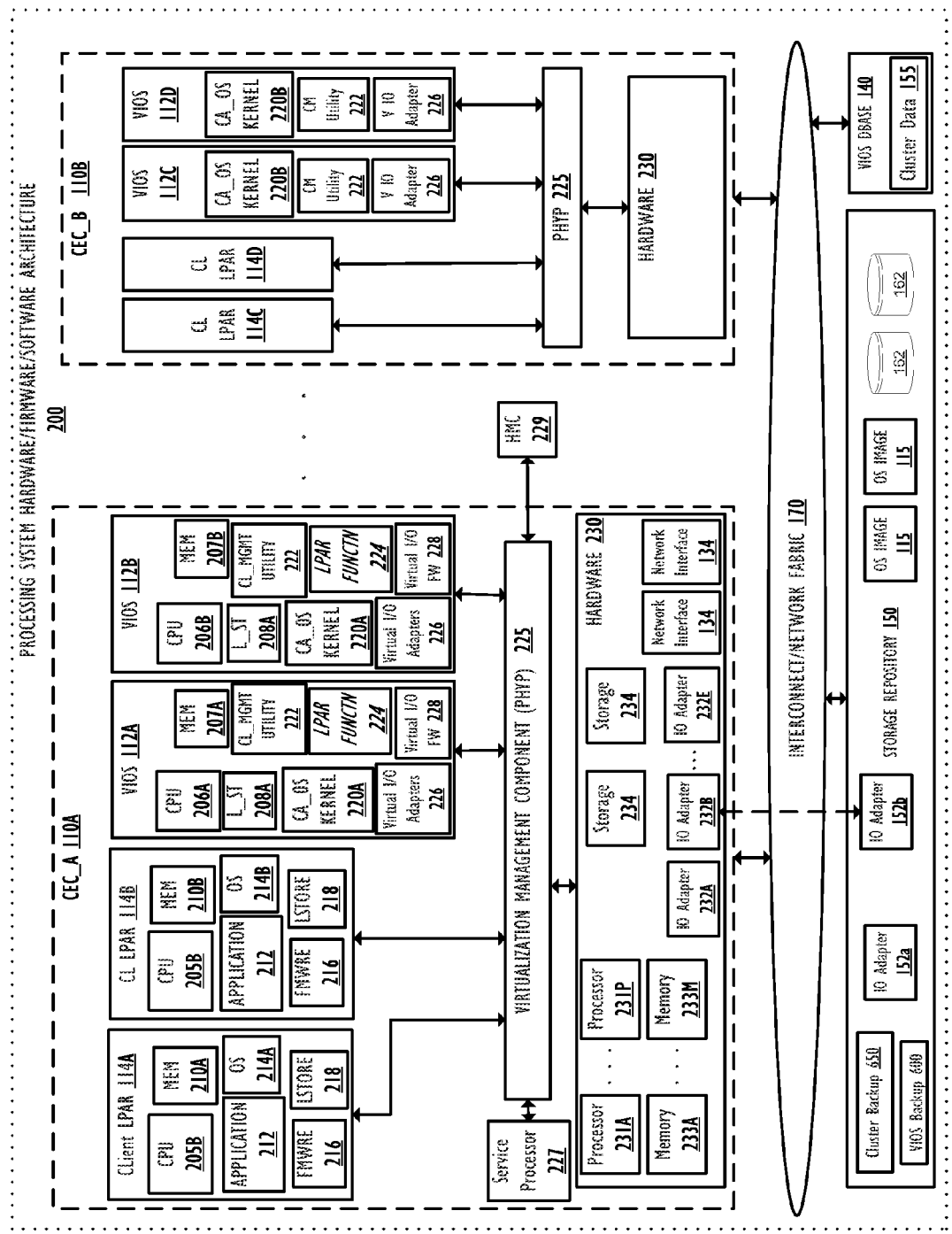
FIG. 2 illustrates an internal configuration of a computing electronic complex (CEC) within the cluster DPS having virtualized OS partitions, including virtual I/O server (VIOS) partitions with functional components that enable cluster awareness, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions. In one or more embodiments, configuration data related to the virtualized adapters and other components that are assigned to the VIOSes (or the clients supported by the specific VIOS) are maintained within each VIOS and may be maintained and updated by the VIOS OS, as changes are made to such configurations and as adapters are added and/or removed and/or assigned.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. HMC 229 is one possible implementation of the management console 175 illustrated by FIGS. 1A-1C, and the use of HMC 229 specifically within this illustration is solely for illustration of one actual embodiment among several available options. Operations of the different logical partitions may be controlled through HMC 229, which is a separate data processing system from which a system administrator may perform various functions, such as reallocation of resources to different logical partitions. Importantly, features related to backup and restoration of OS partitions and in particular of the VIOSes and the VIOS cluster are controlled through the HMC, in the present embodiment, but those features are described more generally with reference to the management console 175 in the various other embodiments presented herein.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports virtual real memory and virtual shared storage functionality (with access to distributed storage repository 150) as well as clustering functionality. Relevant VIOS data and cluster level data are stored within local storage (L_ST) 208 of each VIOS 112. For example, in one embodiment VIOS configuration data of the local VIOS hardware, virtual and logical components. Additionally, and as illustrated within FIG. 4, local storage (L_ST) 208 comprises cluster configuration data 184, cluster state data 185, active nodes list 186. Other illustrative features and/or functionality of VIOS are provided by FIG. 4, which is described below.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B, 1C and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B, 1C and 2) are introduced above with reference to the description of the previous figures, and particularly FIG. 2. Descriptions of the specific functionality of the VIOS 112 will continue to be provided with reference to the illustrations of FIGS. 1A, 1B, 1C and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229 (or more generally management console 175). SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. With reference now to both FIG. 2 and FIG. 4, which provides an expanded view of functional components/modules within example VIOS 112. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOS, when executing within a cluster, to be cluster aware. CA_OS 220 comprises several functional modules. In one or more embodiments, CA_OS 220 can comprise cluster management (CM) utility 222, which supports the configuration of the VIOS to enable cluster-awareness and cluster-level functionality, such as redundant virtual I/O. Each of the additional software components/modules of CA_OS 220 that are directly associated with cluster level functions of the CA_OS 220 can be presented as a functional module within CM utility, in one embodiment, and each module may thus be described as being associated with or a component within CM utility 222 throughout the remainder of this specification. In one embodiment, CM utility 222 may be a separate utility that is locally installed or downloaded (from DB 140, for example) as an enhancement to an existing OS within a CEC 110 or VIOS 112, when the VIOS 112 is initially being configured for operation within a VIOS cluster. CM utility 222 is then executed when configuring the individual VIOS to create or join a cluster and/or become a cluster-aware node within the VIOS cluster. With this implementation methodology, CM utility 222 executes within VIOS 112 and enables the OS to support the various cluster-awareness and other cluster-level features and functionality. In an alternate embodiment, CA_OS 220 includes all the clustering features and functionality and establishes the various clustering functions/features when the VIOS 112 joins the cluster and/or during configuration of VIOS 112 to become cluster-aware.

In one implementation, functional components of CM utility 222 are encoded on local device storage (L_Store 208) of a corresponding VIOS 112, and these components are automatically executed on VIOS start up or initiation such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS 112 executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one or more embodiments, CM utility 222 can also enable retrieval and presentation of a comprehensive view of the resources of the entire cluster. Specifically, in one or more of the embodiments described CM utility 222 can retrieve from cluster DB 140 all relevant configuration data for each other VIOS within the cluster as well as the cluster configuration data stored within cluster DB and CM utility 222 can pull that data to the local VIOS storage during execution of a cluster level backup operation, which is described in greater detail in Section D below. In one or more embodiments, CM utility 222 can also enable/support completion of a restore of the VIOS cluster when appropriately triggered to do so by a command received from the management console 175.

Returning now to the figures as further presented by the illustrative embodiments (i.e., FIGS. 2 and 4, with emphasis on FIG. 4), VIOS 112 includes one or more additional functional modules/components, such as VIO adapter(s) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein. In the CA_OS kernel 220 comprises three layers of software stack, OS kernel software stack 302, storage virtualization software stack 304, VIOS clustering software stack 306. The VIOS software stack 306 provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS).

Also presented within CA_OS 220 is backup/restore utility 450. In one embodiment, execution of back/restore module 450 can be triggered by a command entered into a user interface or on a command line interface at the management console 175. It is appreciated, however, that certain of the backup functions are automated and autonomously performed on some pre-established schedule. The backup schedule for the particular VIOS may be set by an administrator at the management console 175.

Figure 4:
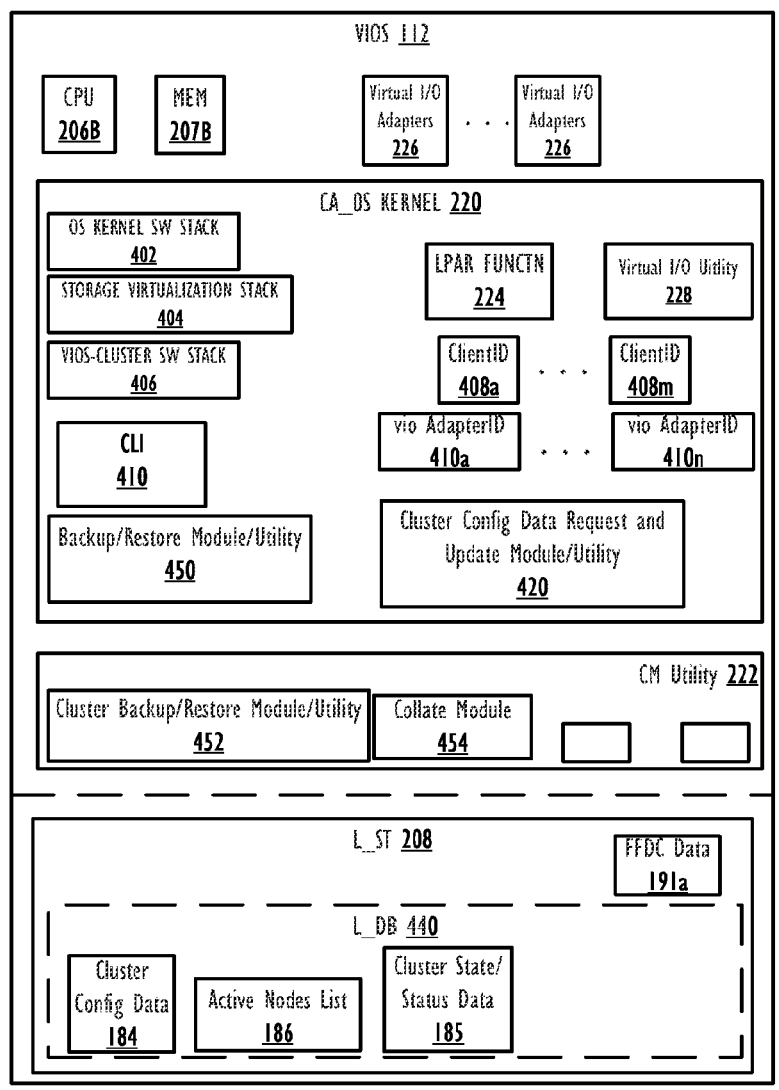
FIG. 4 is an expanded view of an example VIOS with cluster-aware operating system (CA_OS) components and virtualized I/O components and component configuration data, according to one or more embodiments.

The illustrative embodiment of FIG. 4 presents CM utility 222 within VIOS 112 having a cluster backup/restore utility 452, which can be a different executable module from backup/restore utility 450, in one or more embodiments. CM utility 222 also includes collate module 454 utilized to perform collation of backup files during a cluster level backup operation. Additional components/modules of CM utility 222 are illustrated by empty blocks since the additional components are not directly relevant to the present discussion of the back/up restore functionality.

As described herein, implementation of the cluster awareness with the VIOSes of the cluster enables the VIOSes to provide cluster storage services to virtual clients (114). Thus, VIOS contains L_ST 208 within which certain information relative to the local VIOS as well as information related to the cluster are stored. L_ST 208 is a logically carved out portion of actual physical storage of the CEC, and is not considered a virtualized structure from that perspective. Maintained within L_ST 208 is local DB 440. Whenever significant events occur at/to a VIOS within the cluster, the OS 220 (or CM utility 222) updates local OS repository (cache or storage) data entries within local DB 440. According to the described embodiments, VIOS DB 140 and local repository (local DB 440) are utilized to ensure the various nodes (VIOSes) within the VIOS cluster are device level synchronized with each other node in the cluster. As illustrated by FIG. 4 (and expanded by FIG. 5), certain amount of cluster-level data are stored in a local DB 440, which is held within L_Store 234 on each node. In one embodiment, local DB 440 contains configuration data for the devices which exist on that node as well as configuration data relevant for performing a backup of the VIOS DB 140. In one embodiment, this local storage of information enables the processes running on the local node to be able to match the VIOS device with the correct information in the one or more accessible distributed databases (140/150).

Returning to the illustrative embodiment of FIG. 2, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B, FIG. 2 and FIG. 4, and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms can be utilized interchangeably throughout the specification.

With the above introduced system configuration of FIGS. 1(A-C)-4, VIOSes 112 are provided with I/O access to each other, to VIOS cluster DB 140 and to distributed storage repository 150 through one or more virtual adapters (via PHYP 225), and each VIOS is cluster aware. With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. VIOS Shared DB for Cluster Management

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client.

Figure 5:
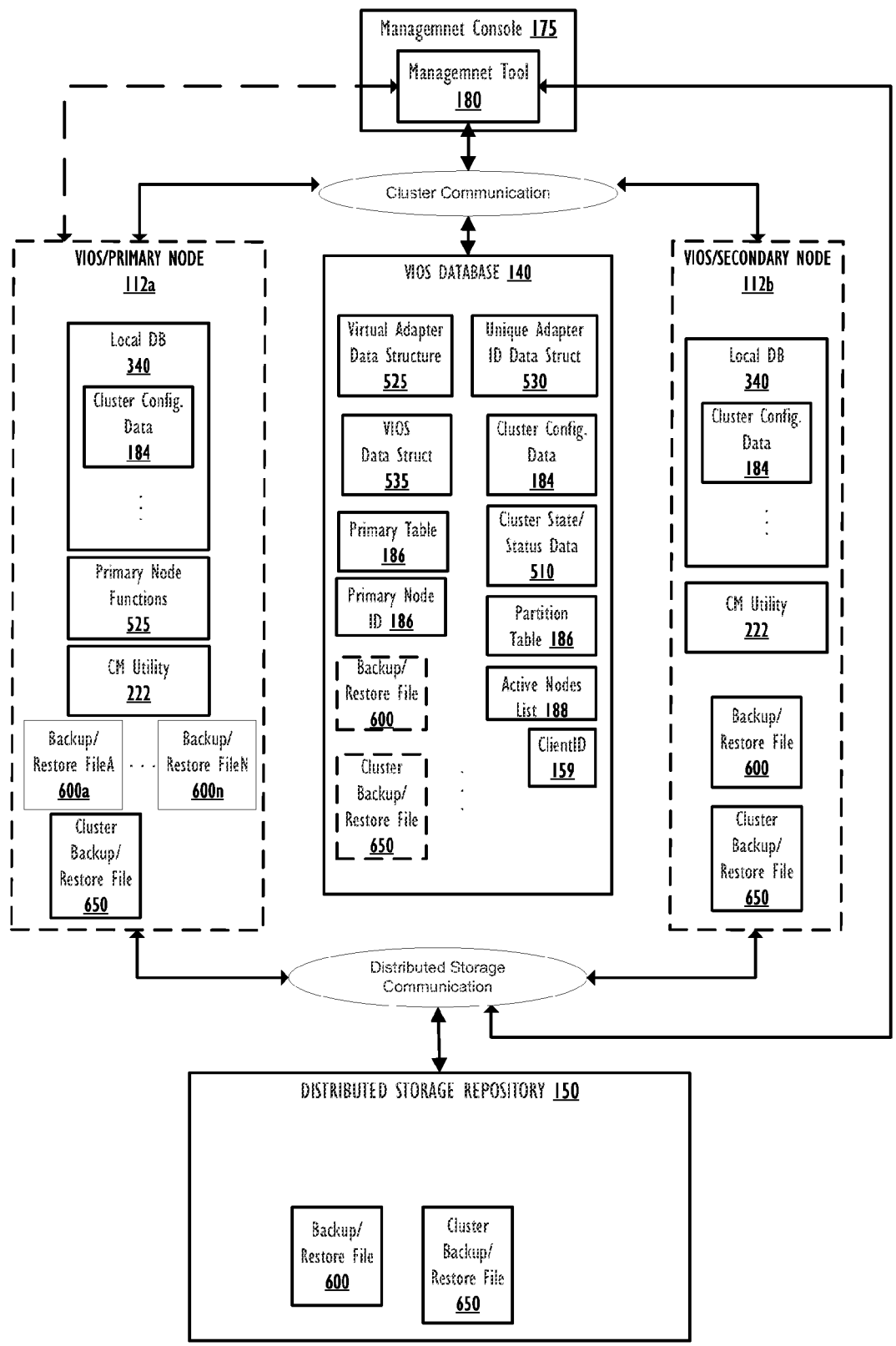
FIG. 5 is a block diagram representation of stored data structures and other functional components within a VIOS cluster database (DB) and within local VIOS DB storage, according to one or more embodiments.

FIG. 5 is a block diagram representation of functional components of a primary node, a secondary node and shared storage (DB 140) to enable cluster level information/data storage, management and exchange between the nodes and VIOS shared storage (DB 140). In one embodiment, a local copy of (relevant data of) DB 140 is shared by each VIOS within the cluster and stored in respective local DB 340. Each VIOS is then responsible for storing, maintaining and updating the data structures at DB 140 in one embodiment. As illustrated by FIG. 5, DB 140 is accessible to the various VIOS nodes 112 and to management tool 405 via cluster communication fabric. Database 140 comprises several different modules of data, which may be arranged in a plurality of formats (e.g., tables, raw data, sequenced data, etc.) According to the figure, DB 140 includes a virtual adapter data structure 525, which maintains a listing of and configuration information about the virtual adapters. DB 140 also includes a second data structure 530 that holds the unique adapter identifiers (AdapterIDs), and is therefore referred to herein as AdapterID data structure 530. DB 140 maintains a listing of and information about the VIOSes within a VIOS data structure 535. In one or more embodiments, each of the described data structures 525-535 can be or can include a table within DB 140. When a virtual adapter is first discovered, the cluster management (CM) utility 122 (FIG. 1B) creates a row within the virtual adapter data structure 525 and a row within the unique AdapterID data structure 530. These two rows in the different data structures are associated with each other, and the identifier (ID) is guaranteed to be unique. In one or more embodiments, adapter names are unique per CEC 110, and where VIOS partitions are not "mobile" (i.e., do not move from a first CEC to a second CEC), the adapter names can be identified using a CEC, name tupple. In one embodiment, VIOS DB 140 can also store information needed to configure a virtual target device (VTD) for a particular client.

When a VIOS 112 is first configured, the VIOS downloads from DB 140 a copy of cluster configuration data 505 and cluster state/status data 510 from VIOS DB 140. Additional data that can be retrieved from DB 140 are partition data 186, active nodes list 188, and client ID data structure 159. In one embodiment, VIOS DB 140 can comprise a copy of VIOS backup/restore file 600 for each VIOS and/or VIOS configuration 191. VIOS DB 140 may comprise a plurality of additional data structures and/or components, some of which are illustrated within VIOS DB 140, but are not germane to the description of the embodiments presented herein.

In one embodiment, DB 140 receives VIOS generated data from each VIOS across the cluster and DB 140 populates its various data structures with the received data. According to one embodiment, VIOS 112 creates a unique identifier (ID) (i.e., a ClientID) for each client that is mapped to the VIOS for I/O processing. The VIOS 112 then stores the unique ClientID in ClientID data structure 159 (FIGS. 1B and 5) within DB 140. The DB 140 and by extension the ClientID data structure 159 are accessible to each VIOS partition in the cooperating cluster (DPS 100). The VIOS 112 also generates an identifier for each virtual IT nexus (virtual I/O AdapterID) that is utilized for each virtual adapter assigned to the client LPAR 114. These vioAdaptedDs are stored in the AdapaterID data structure 158 and are associated with their corresponding clientIDs (block 312). With this use of DB 140 to maintain clientID-to-VIO Adapter mappings, each clientID can be associated with a corresponding one or more vioAdapterIDs, and every VIOS within the cluster is aware of the I/O adapter mappings across the entire cluster.

With information about each device being stored in the DB 140, operations on those devices can be performed from any VIOS node in the cluster, not just the node on which the device resides. When an operation on a device is performed on a "remote" (non-local) node (i.e. one other than the node where the device physically resides), the operation is able to make any changes to the device's information in the DB 140, as necessary. When corresponding changes are needed in the device's local database, the corresponding CM utility 222 enables the remote node to send a message (using cluster services) to the local node to notify the local node to make the required changes. Additionally, when a node in the cluster is booted up, or when the node rejoins the cluster after having been lost for any period of time, the node will autonomously reference the DB 140 in order to synchronize the data there with the local data of the node.

As an example, if an operation to delete a VIOS device from the local node is executed on a remote node, the operation will remove the information associated with that device from the DB 140, and send a message to the local node to tell the local node to remove the device from the local database. If the local node is down or not currently a part of the cluster, when the local node first boots up or rejoins the cluster, the local node will automatically access the DB 140, retrieve current data/information that indicates that the information for one of the local devices has been removed, and delete that device from the local database records.

In one embodiment, data stored within VIOS DB 140 is accessible to management tool 180 via a cluster communication infrastructure. When backup/restore files 650 and/or cluster backup/restore files 650 are stored at VIOS DB 140, this direct connection of management tool 180 enables management tool 180 to efficiently access all backup/restore file data for each VIOS across the entire VIOS cluster from DB 140. As further presented by FIG. 5, management tool 180 may also retrieve or access Backup/restore files 600 and/or cluster backup/restore files 650 from distributed storage repository 150. In an alternate embodiment, management tool 180 is provided access to backup/restore file 600/650 via a direct connection with any one or VIOSes 112 (or specifically a primary node, in one embodiment) within DPS 100. In the illustrative embodiment, management tool 180 has a communication link 550 with VIOS 112*a*, which servers as a primary node for the cluster.

According to one embodiment, the VIOSes that are part of the cluster can query each other to get information regarding the storage and configuration data seen by the other VIOS. Thus, any one of the VIOSes can be queried by the management tool 180 to provide all the information for some other VIOS or for all the nodes within the cluster. The flexibility provided to the management tool further enhances the management tool's performance, as the management tool 180 can obtain all the data by querying just a single node, instead of having to query each node in the cluster, in sequence.

D. VIOS Backup and Restore Operations

According to one or more embodiments, various functional features of the CA_OS can be established to allow for efficient backup of configuration data at the individual VIOS level (Section D) as well as at the VIOS cluster level (Section E). Aspects of the described embodiments involve a system administrator accessing the CA_OS of a particular VIOS and setting the backup parameters to enable the backup module to back up either the local VIOS or the entire VIOS cluster. The described embodiments enable system administrators to configure local VIOS and restore operations (presented in Section D1) and cluster level backup and restore operations (presented in Section D2). In one or more embodiments, access by the system administrator is provided via a management tool 180 executing within a management console 180, which is communicatively connected to the CEC and/or more specifically to one or more OSes of the VIOSes 112. In one embodiment, such system administrative access is via a command line interface to the OS.

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository (storage repository) 150. The various presented embodiments further provide application of management tool (180) functionality and descriptions of the messaging and communication protocols (of the clustered VIOSes 112) that collectively enable cluster-awareness and efficient I/O and storage virtualization and I/O and storage management within the DPS. These embodiments are supported/provided by additional functionalities of (i.e., encoded within) the CA_OS 220 and/or CM utility 222.

Figure 6A:
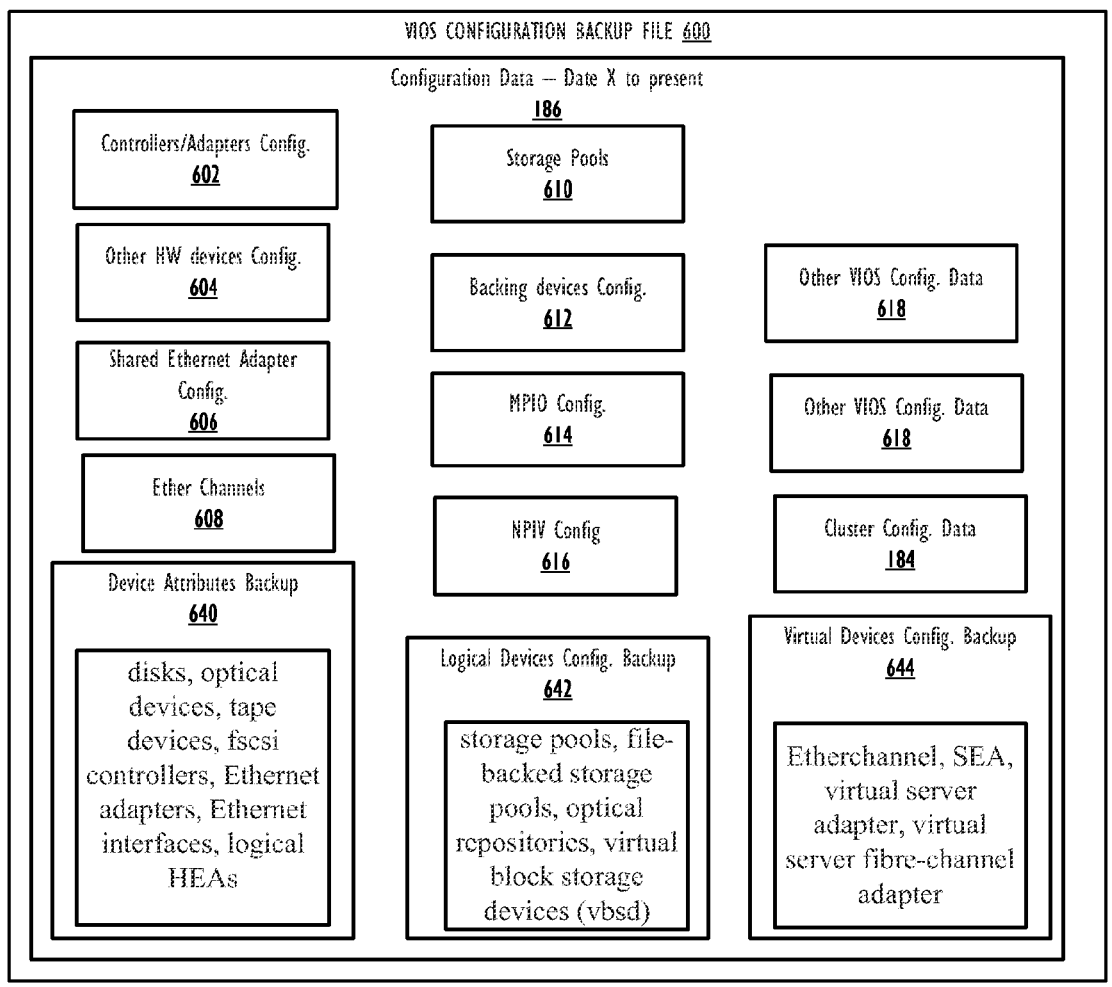
FIGS. 6A and 6B are block diagram representations of a VIOS backup file and a VIOS cluster backup file, respectively, according to various embodiments.
Figure 6B:
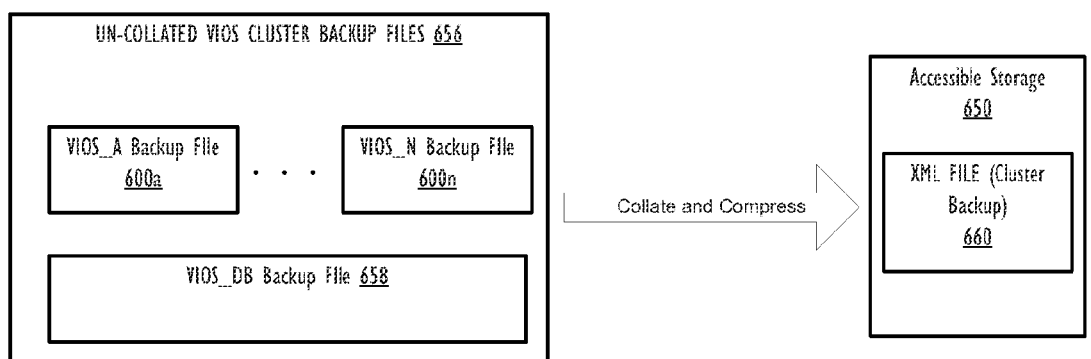
Figure 7:
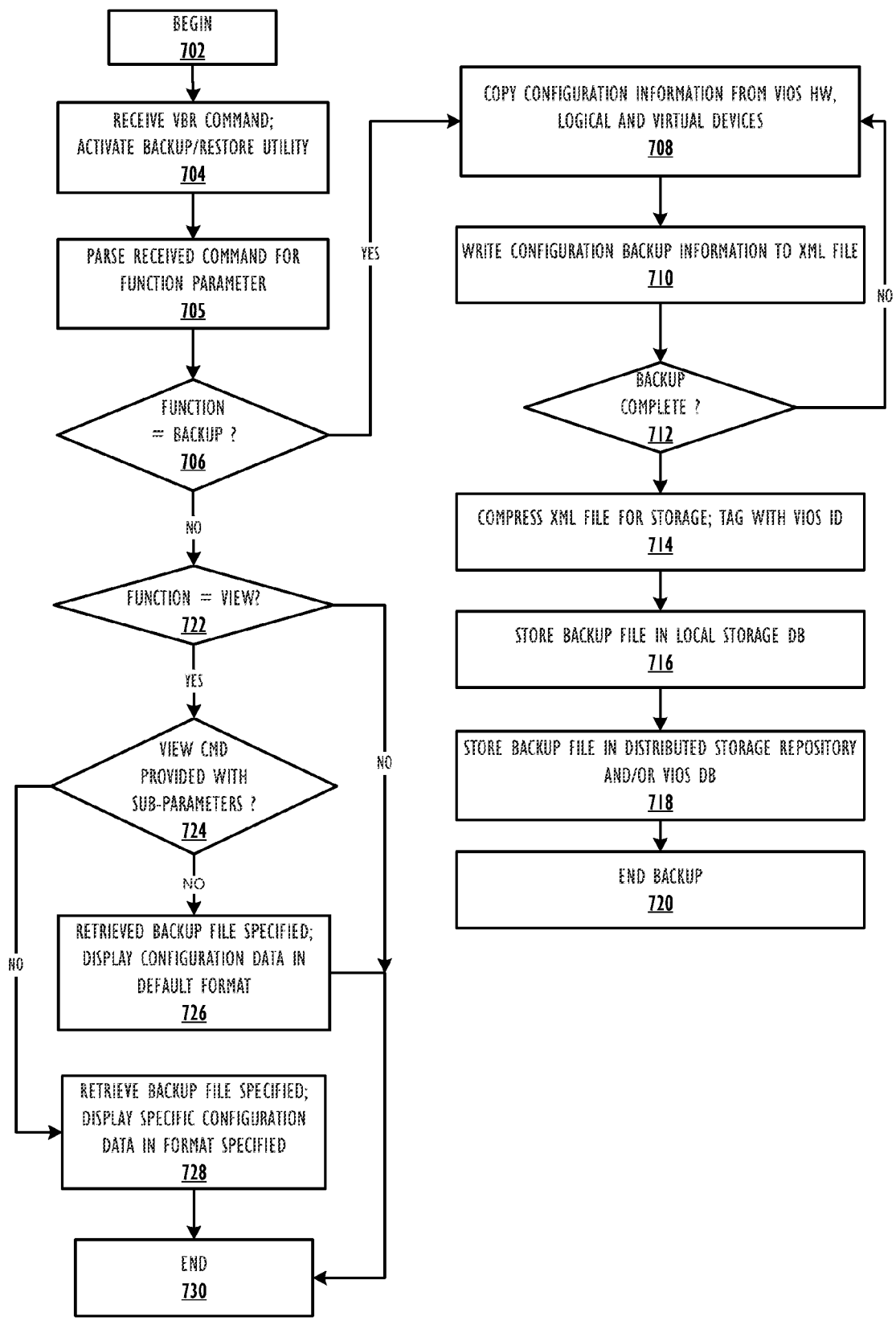
FIG. 7 is a high-level logical flowchart illustrating an example method by which a VIOS backup operation occurs within the CA_OS environment, according to one or more embodiments.
Figure 8:
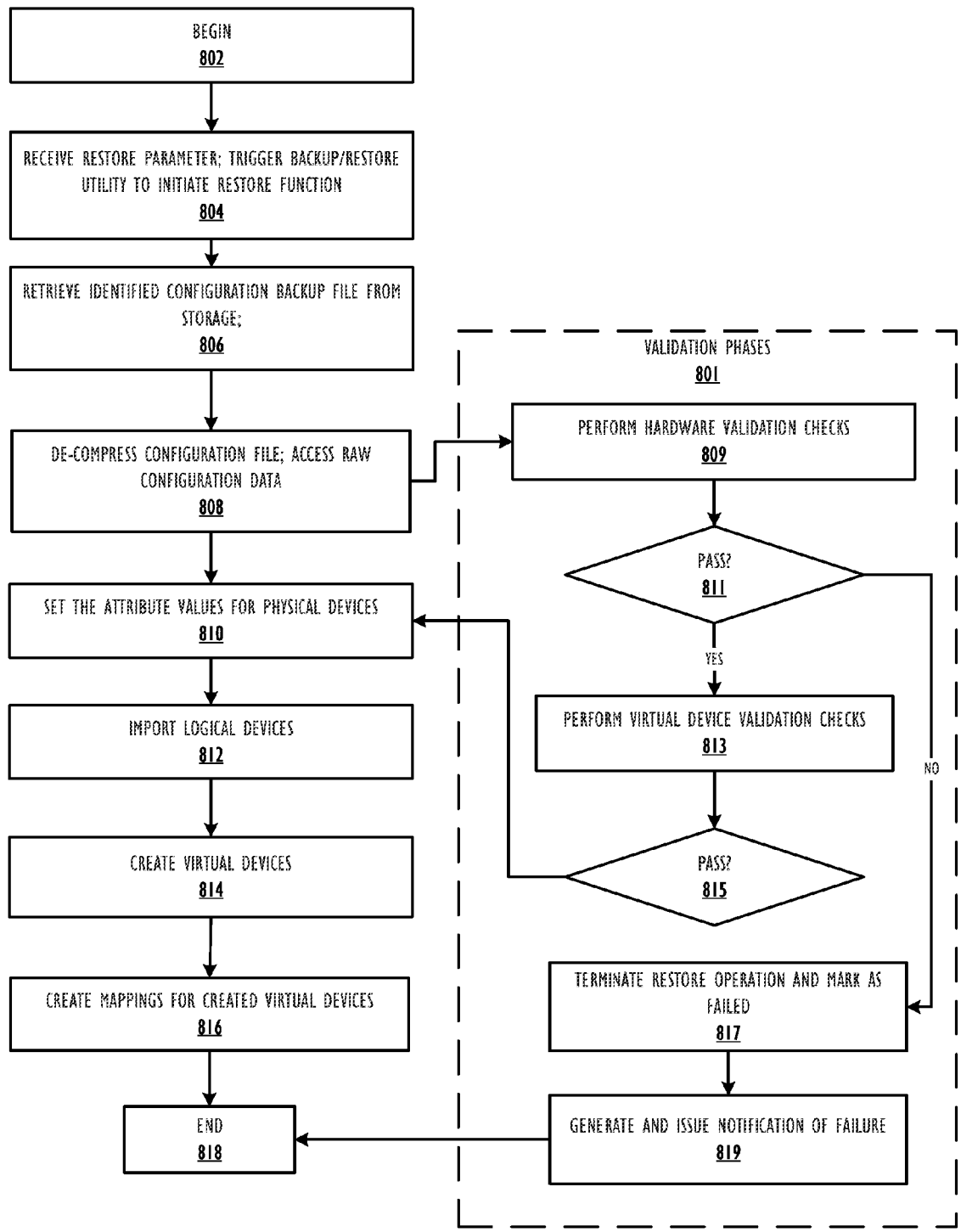
FIG. 8 is a high-level logical flowchart of an example method by which a VIOS restore operation is completed by a CA_OS within a VIOS, according to one or more embodiments.
Figure 9:
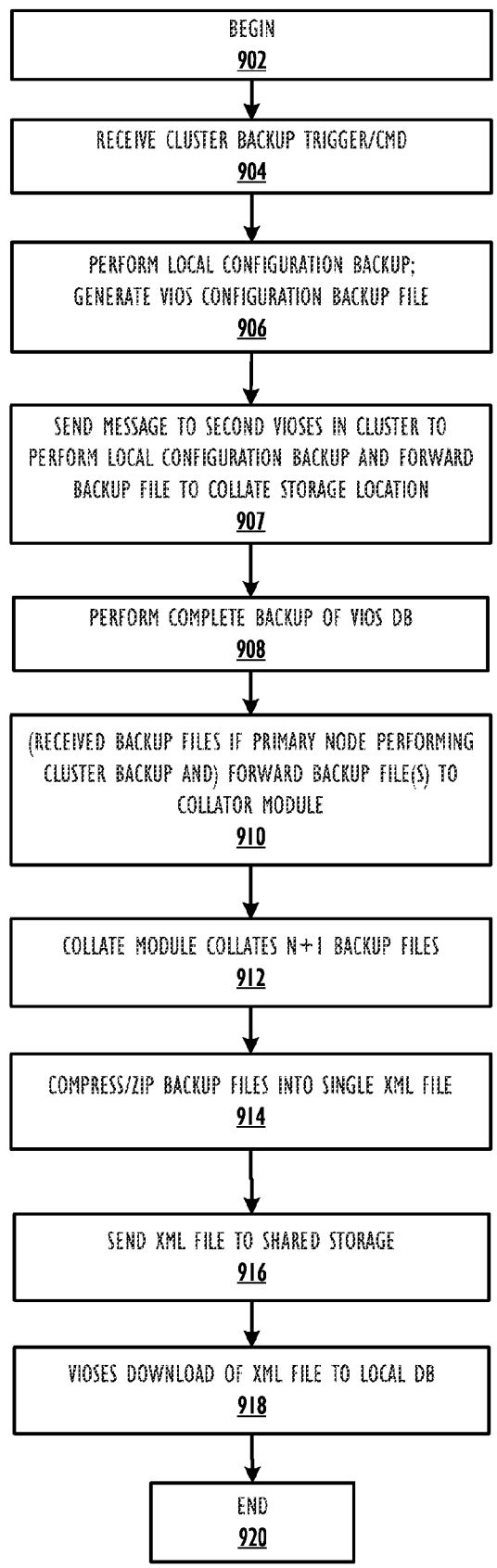
FIG. 9 is a high-level logical flowchart illustrating an example method by which a cluster level backup and restore operation occurs within the CA_OS environment, according to one or more embodiments.

The flow charts of FIGS. 7-9 illustrate embodiments of various methods by which the above introduced processes of specific embodiments are completed. Although the methods illustrated by FIGS. 7, 8, and 9 may be described with reference to components and functionality illustrated by and described in reference to FIGS. 1-6, it should be understood that this is merely for convenience and alternative components and/or configurations thereof can be employed when implementing the various methods. Certain portions of the methods may be completed by functional components/modules of CA_OS 220 and/or CM utility 222 executing on one or more (virtual) processors (CPU 206A) within VIOS 112 (FIG. 1 or 2). The executed processes then control specific operations of or on CECs 110, VIOSes 112, and DB 140 (and distributed storage repository 150, in some embodiments).

It is further appreciated that within the description, the various backup and restore functionalities can be described as being provided by a specific backup/restore utility 450 (FIG. 4) of the CA_OS 220 and/or a specific cluster backup/restore utility 452 (FIG. 4) of the CM utility 222. For simplicity in describing the methods and the embodiments in general, all method processes are described from the perspective of a single backup/restore utility 450 and/or components/modules within CA_OS 220 operating within a CA_VIOS 112 of a VIOS cluster.

D1. Single VIOS Backup

Specific descriptions of the operation and/or functionality of the backup/restore utility 450 are presented with reference to the block representation of a backup files of FIG. 6 and the flow charts of FIGS. 7 and 8. Turning now to FIG. 6, there is illustrated a block diagram representation of the various types of configuration data that is copied into an example VIOS backup file 600. The specific components within VIOS backup file 600 will be introduced in the following description, which is also presented with reference to the example method, illustrated by FIG. 7, of performing a backup operation, according to one embodiment.

Generally, the backup/restore utility 450 automates the backup and restoration of virtual and logical device configurations on a VIOS partition. According to one embodiment, the backup/restore utility 450 performs a backup of all the hardware, logical and virtual devices on the VIOS partition and stores the configuration backup data into an extensible markup language (XML) file (VIOS backup 650). In one or more embodiment, the backup/restore utility 450 also includes the functionality to allow the user to view the various virtual and logical device configurations. In an extension of each of these embodiments, the backup/restore utility 450 also comprises the functionality to restore these configurations later on the same OS partition. This automation of the restore task via the backup/restore utility 450 provides the following advantages, among others: (a) correctness in the configuration backup data in that the utility ensures that all the available backed-up devices are restored to the same state when the backup was taken; (b) efficiency in completing the restore compared to over a manual (e.g., via an system administrator) restore; (c) inexpensiveness, as only the VIOS configuration data is backed-up and the full partition data does not need to be backed up; and (d) expandability, whereby the techniques provided by the backup/restore utility 450 can easily be enhanced to support any new hardware, virtual or logical devices.

According to one embodiment and as illustrated by FIG. 6A, the various VIOS configurations that are backed up into the backup (XML) file 600 comprise controllers/adapters 602 and other hardware devices 604, Shared Ethernet Adapters (SEA) 606, Ether Channels 608, Storage pools 610, backing devices 612, multipath I/O (MPIO) configurations 614, N_Port ID Virtualization (NPIV) 616, and others. Accordingly, the backup/restore utility 450 does not capture information/data on the client LPAR 114 or hosted partitions, but only the configurations on the VIOS 112. All other client-level backup can be performed via standard OS backup features, which backs up the specific client application data and states. Thus, according to one embodiments, as one possible restore option for situations such as a VIOS crash (e.g., a condition that leads to corruption of the rootvg file), the backup/restore utility 450 provides the functionality to reinstall the earlier backed up data (i.e., restore the data from an earlier completed data backup of VIOS or other OS partition) and then replay the configuration of the VIOS from the configuration backup (XML) file 600.

According to one embodiment, the various functions of the backup/restore utility 450 can be triggered from the management console 175 via input of a specific backup/restore command, which is received by the backup/restore utility 450 (block 704) following initiation of the process (block 702). This input may be within a user interface or a command line interface depending on the design and/or implementation of the management tool 180. In the various embodiments, the VIOS backup/restore (VBR) command handles/implements/triggers the backup/restore utility 450 to perform the functions/operations of (a) backing up virtual & logical configuration, (b) listing the configurations within an output space and (c) restoring the configurations of the specific VIOS. In one embodiment, these various functional features are triggered by specific ones of a plurality of parameters that can be associated with the backup/restore command. For example, in one implementation, VBR command can take the following parameters: (a) backup, which initiates the backup process; (b) view, which lists the various configuration data within the specified backup file; and (c) restore, which performs the restore operation for the particular VIOS linked to the target backup file. The implementation of the various features is now described in greater detail.

In the method of FIG. 7, following receipt of the command, the backup/restore utility 450 parses the command for is associated parameter and parses the received command (block 705) for a specific function parameter that indicates which of the three functions of the utility has been activated. According to the embodiments, when, as determined at block 706 the command is to perform a backup operation, the VBR command is implemented with the backup parameter while targeting a first VIOS. The backup/restore utility 450 of the VIOS is triggered to perform the backup function on the first VIOS. With these embodiments, receipt of the backup feature with the VBR command, (as determined at blocks 705/706) triggers the backup/restore utility 450 to back up (i.e., capture a current copy of) all the device properties and virtual devices configurations on the first VIOS (block 708). In one more embodiments, the information that is copied into the backup file includes devices attributes information 640, logical devices information 642 and virtual devices information 644. In one embodiment, the device attributes information 640 comprise device attributes for disks, optical devices, tape devices, fscsi controllers, Ethernet adapters, Ethernet interfaces, logical host Ethernet adapters (HEAs). In one embodiment, the logical devices information 642 comprises information about storage pools, file-backed storage pools, optical repositories, virtual block storage devices (vbsd). In one embodiment, the virtual devices information 644 comprises information on devices such as Etherchannel, SEA, virtual server adapter, and virtual server fibre-channel adapter. The VBR command (backup) can be provided additional variables that trigger the backup/restore utility 450 to run (perform the backup operation) once or more than once at a stipulated period of time along with a 'frequency' parameter, such as but not limited to daily, weekly, or monthly. For example, the command may trigger the backup/restore utility 450 to perform daily backups at 00:01 hrs.

In one embodiment, an additional parameter can be specified with the VBR command to enable the user (e.g., administrator) to specify the number of backup files that can be saved for a single backup target (VIOS). Thus, for example, the parameter may be set to 10, which then enables backup/restore utility 450 to save the last 10 copies of the configuration files backed up. This storage can be within local storage 208 or on the distributed storage repository 150. With this embodiment, the backup/restore utility 450 also comprises a mechanism by which an oldest stored backup file is automatically removed from the list of backup files in response to the list being at a maximum capacity and a new backup is triggered for completion. According to the various embodiments and as illustrated by FIG. 6B, the configurations backup data/information are written into an XML file (block 710). Once the backup is completed, as determined at block 712, the XML file is compressed for storage and the compressed filed tagged with the particular VIOS identifier (ID) for use during a later restore process (block 714). The backup file is stored in the local DB 440 (block 716), and a copy can be forwarded to distributed storage repository 150 or VIOS DB 140 (block 718). A default storage location within distributed storage repository 150 or within local store 208 is provided to backup/restore utility 450. However, alternate embodiments enable the user/administrator to specific a location for storage of the generated backup files. The backup process then terminates at end block 720.

According to the embodiments, when the VBR command is implemented with the view parameter while targeting a first VIOS, the backup/restore utility 450 of the first VIOS is triggered to perform the view function on the selected backup file. With these embodiments, when backup/restore utility 450 receives the view feature with the VBR command (as determined at block 722), backup/restore utility 450 determines (block 724) whether or not there are specific sub-parameters defined with the view option. When there are no additional parameters specified, the receipt of the view parameter triggers the backup/restore utility 450 to retrieve the specified backup file and display the information of all the backed up entities in a default/standard formatted output (726). Implementation of the view feature requires an input file in a compressed format, which was generated with the "backup" function. As indicated by block 728, one or more parameters may be defined along with the view function to enable specific information of the backup file to be presented and in specific format or order. Also, options can be provided in one embodiment to provide only a minimal view or a detailed view of the configuration data. In one embodiment, one option is provided that provides an output of a logical mapping for one or more of virtual scsi server adapters, SEA, SVFC Adapters, storagepool-disk, FBSP-parent SP, repositories-parent SP. The mapped entities displayed can be controllers, disks, optical devices, tape devices, network adapters, network interfaces, storage pools, repositories, etherchannels, Shared Ethernet Adapters, vscsi server adapters, SVFC Adapters and paging devices. A final option allows for the display of the list of saved backup files from the store location or from a user defined location. The view option and the method ends at block 730.

D2. Single VIOS Restore

FIG. 8 illustrates some of the features related to the method for performing a restore of a VIOS backup file, according to one or more embodiment. In these embodiments, the backup/restore utility 140 takes an earlier backup file as input and performs one or more processes to bring the VIOS partition to the same state as the existing state when the backup was originally taken. According to the embodiments, when the VBR command is implemented with the restore parameter while targeting a first VIOS, the backup/restore utility 450 of the first VIOS is triggered to perform the restore function using the backup file corresponding to the selected VIOS (or vice versa, where the backup file is the target of the command). With these embodiments, following initiation of the method (block 802), receipt of the restore parameter (block 804) operates to trigger the backup/restore utility 450 to retrieve an earlier backup file from storage (block 806) and de-compress that backup file to gain access to the raw configuration data stored within the file (block 808). In the illustrated embodiment, once the files are decompresses and the information is available, the backup/restore utility 450 performs a series of validation checks 801. These checks include a hardware validation check 809, which if passed (as determined at block 811), allows the backup/restore utility 450 to proceed with a virtual device validation check (813). If either of these two validation checks fails (as determined at blocks 811 and 815), the backup/restore utility 450 terminates the restore operation and marks the operation as failed (block 817). The backup/restore utility 450 generates and issues a notification of the failure (block 819), in one embodiment. With the information available from the input file, the backup/restore utility 450 performs the functions of setting the attribute values for physical devices (block 810), importing logical devices (block 812), and creating virtual devices (block 814) and corresponding mappings of the virtual devices (block 816). The method process then terminates at end block 818. In one or more embodiments, the attributes can be set for controllers, adapters, disks, optical devices, tape devices, and/or Ethernet interfaces. In one embodiment, the logical devices that can be imported include volume groups/storage pools, LVs, filesystems and repositories. Also, in one embodiment, among the virtual devices that can be created are etherchannel, shared Ethernet adapter, and virtual target devices. Additionally, in one or more embodiments, the backup/restore utility 450 performs the functions of creating mappings between virtual scsi server adapters-VTD-backing devices, vfc server adapter-fc adapter and vrmpage-backing devices.

In one embodiment, execution of the VBR command with the restore option needs to be run on the same VIOS partition from which the backup file was taken. The VBR command can also be provided with parameter values to trigger the backup/restore utility 450 to perform validation of the devices on system, restoring of a category of devices, and performing the restore operation interactively.

According to one embodiment, the backup/restore utility 450 performs the restore operation in multiple phases, which includes a hardware validation phase (blocks 809 and 811) and a virtual device configuration validation phase (blocks 813 and 815). In the described embodiments, the backup/restore utility 450 performs the hardware validation first and then follows the hardware validation with the virtual device configuration validation. While the two validation phases 801 are each generally presented by two blocks, a more detailed description of several of the various different considerations required for each phase are described below. The general presentation in the figures is solely for illustration.

According to one embodiment, during the hardware validation process, the backup/restore utility 450 compares the Fibre Channel Adapter and Fibre Channel Controller attributes saved in the backup XML file with those attributes that exist on VIOS (block 852). The backup/restore utility 450 determines (block 854) if there is any mismatch between the backup attributes and the VIOS attributes. In response to the attributes being the same on both the backup file and on the VIOS, the backup/restore utility 450 changes the attributes to the ones from the backup file (856). Otherwise, where the backup/restore utility 450 determines that the attributes are not the same (e.g., the backup command fails), the backup/restore utility 450 updates a lists containing attributes that are not changed (block 858). In one embodiment, a registered failure of the comparison operation on any of the hardware devices in phase causes the backup/restore utility 450 to generate a warning message that is relayed back to the management console. During an interactive restore operation, the backup/restore utility 450 provides the user with a choice of whether or not to continue along with the restore operation, and the warning message indicates the point of failure in the process.

One embodiment provides for a backup of SCSI, SAS, ISCSI, Optical and Tape controllers. In one example, tape devices, optical devices, physical adapters and logical Host Ethernet Adapters can be compared and validated. The order of such comparison and validation follows the presentation order for each of these types of devices.

For the second phase of the restore operation, which provides a validation of virtual and logical device configurations, the backup/restore utility 450 requires that all VIOS entities in the backed up XML file should be validated before identifying the entity as actionable items for deployment. For this process, a level of validation needs to be decided, and the backup/restore utility 450 performs one or more of the following validations:

(a) SEA validation, whereby a check is made whether the physical adapter location code in the xml matches any of the location codes on the VIOS system. The embodiment requires each of the following conditions: (1) that the physical adapter location code exists and be available; (2) that the adapter location codes used for the Etherchannel exist and be available; (3) that the virtual adapter location codes be the same. Then, once these values check out to be accurate, and in response to the target adapter, virtual Ethernet adapters and control channel adapters being available, the backup/restore utility 450 determines that identifies the SEA as an actionable item and deploys the SEA. If any of the virtual adapters or the target physical adapter are already being used, the backup/restore utility 450 will mark the SEA as not being deployable. Where the SEA has an interface configured, all the attributes of the interface will be validated. If the physical adapter for the SEA already has Internet Protocol (IP) configured on the physical adapter, the backup/restore utility 450 migrates the IP to the SEA, if needed.

(b) Etherchannel validation requires that the physical adapters location codes should be same. If all the target adapters match and are available, the backup/restore utility 450 identifies the Etherchannel as an actionable item and will deploy the Etherchannel. However, in response to any of the target adapters being already used by another device, then the backup/restore utility 450 identifies the Etherchannel as not deployable.

(c) SP validation requires that the disks should be same. The backup/restore utility 450 ensures that the disks are the same by validating the UDID of the disks. According to one or more embodiments, the UDID can be either a "unique_id" or "ieee_vol_name" or "pvid". Additionally, for SP validation, the disks should be available. That is, the disks cannot be assigned to any clients and should not be a part of any other SP, in one embodiment. Further, the SP name should be the same and the default SP characteristic should be same. In the event that a name already exists and if all of the disks match, the backup/restore utility 450 identifies the SP as already deployed. In response to the conditions that the all disks are free and the SP name is not in use, then the backup/restore utility 450 identifies the SP as an actionable item and the backup/restore utility 450 deploys the SP.

(d) To complete validation of a VTD, the type of VTD is required in making the evaluation. If the VTD is SP-based, the SP name should be the same and the VTD size should be same (between the XML file and the current version on the VIOS). Also, the vSCSI server adapter slot should be same. However, if the VTD is PV-based, then the disk should be same and the vSCSI server adapter slot should be same. For lvbased devices, file backed devices, optical devices or tape backing devices, the backing device name as well as the parent SP should be validated.

In one embodiment, in which a FBSP or optical repository is to be restored, the backup/restore utility 450 requires that the FBSP name should be same and that the parent SP should be same. In the event that the name of the FBSP/optical repository matches and the parent SP also matches, then the backup/restore utility 450 identifies the FBSP/optical repository as already deployed. However, in situations when the FBSP does not exist and the parent SP exists, then the backup/restore utility 450 creates the fbsp. Finally, in the even that the FBSP name matches, but the parent SP does not match, then backup/restore utility 450 cannot deploy the FBSP.

E. Backup and Restore of VIOS Cluster

The techniques and/or methods presented by the various embodiments described herein can be utilized to recover from a VIOS crash as well as a VIOS cluster crash, according to various embodiments. Within these embodiments, further enhancements are made to the VBR command as well as to the backup/restore utility 450. According to these embodiments, the backup/restore utility 450 receives a special parameter within the CBR command that triggers the backup/restore utility 450 to immediately commence copying the entire local DB copy of the VIOS database within a backup file VBR command execution. Once the entire VIOS DB has been backed up, additional enhancements to the VBR command and to the backup/restore utility 450 enables the backup/restore utility 450 to restore the various individual VIOS objects from the DB backup file and thus recover the larger overall system from a cluster crash in a substantially automated manner. With this single source restore feature available to the VIOS cluster, the system administrators are able to quickly and efficiently recover the VIOS cluster setup with little to no human errors involved.

The VIOS cluster restore functionality of backup/restore utility 450 takes advantage of the availability of the shared VIOS DB 140 that provides a single accessible location at which is kept all of items in the configuration of the entire VIOS. A copy of the configuration data for the entire VIOS cluster is retrieved from the VIOS DB and downloaded into the local DB 440 (FIG. 4) of each VIOS. Each VIOS 112 is then provided functionality to support receiving input via a Command Line Interface (CLI) 410 (FIG. 4). With the use of the CLI 440 to gain access to the cluster restoration functions of the backup/restore module 450 (452), a system administrator is provided with a mechanism to manage and/or restore the VIOS cluster when the connection to management tool 180 is lost. By entering a specific VBR command and cluster restore parameter within the VIOS using the CLI 410, the administrator triggers the backup/restore module 450 to access the local DB 440 and retrieve relevant configuration information to restore the VIOS cluster. This, In one embodiment, the availability of the CLI 410 within a local VIOS that includes a local DB 440 which autonomously maintains copies of the VIOS cluster configuration data (as a part of being cluster aware) provides a plurality of functional benefits, including: a quick and scalable way to access the VIOS mappings from one VIOS; a way to determine which disks devices are being used by which client LPARs; and a way to manage the reservation policies for the VIOS Logical Units (FIG. 3). As described above, the local DB 226 database will be resident on each VIOS partition and there could be hundreds of VIOS partitions in a cluster, each having a separate local DB 440 storing cluster configuration data that can be utilized by the backup/restore module 450 to restore the VIOS cluster.

Thus, in the scenario where the whole cluster infrastructure is corrupted and becomes unusable, the VIOS cluster can be recovered from this error and brought back up to an operational state based on the last successful backup (i.e., pooling across the VIOSes from the VIOS cluster) of the configuration data. In one or more embodiments, and as illustrated by the flow chart of FIG. 9, creation of each VIOS cluster backup file 650 involves a series of processes that are performed by the backup/restore module 450 of one or more nodes. In one embodiment, a primary node performs the backup function as a part of its core primary node functions. The primary node (which may simply be the node at which the cluster backup command is received or initiated) sends a message to each second node in the cluster requesting completion of the local VIOS configuration backup and informing the second node of the location in which to place the locally generated XML file. Each second node is provide the same storage location so that all N nodes (of the cluster) will places their respective VIOS backup file 600 in the same location for collation. The location can be that of the VIOS DB 140 or can be within the distributed storage repository 150 or a location that is generally accessible to all VIOSes within the VIOS cluster. The first VIOS also triggers a data backup/dump from the VIOS DB 140 to the same storage location.

Referring now to FIG. 9, following initiation of the method at block 902, each VIOS within the VIOS cluster receives a cluster backup trigger/command (block 904) and performs a local backup of that VIOSes' device configuration data (block 906). In one embodiment, the primary node may signal the other nodes to perform a period backup of their local device configuration data (block 907). The message sent to the other second VIOSes, in this embodiment, also includes information on a collate storage location to which the second VIOSes are to forward their respective XML backup files (907). In another embodiment, this trigger may be pre-established during registration of the VIOS within the VIOS cluster, such that all automatically performs the cluster level backup of their local configuration data at the same schedule time on some pre-set period. In another embodiment, a system administrator may initiate concurrent (or overlapping or sequential) execution of the VBR command on all nodes within the VIOS cluster to trigger their individual the backup/restore module 450 to perform the backup of the local configuration data. Each of the N VIOSes thus generates a local copy of its own configuration backup file (block 906), where N is the total number of nodes in the VIOS cluster. The system administrator or an automated backup process also takes a backup of the VIOS database 140 (block 908). In one embodiment, the backup/restore module 450 of the primary node performs this VIOS DB backup. Alternate embodiments can provide for another mechanism by which the VIOS DB 140 is backed up. The VIOS DB contains the metadata required to recover the VIOS cluster. Once the backup operation completes on each VIOS and on the VIOS DB 140, there are N+1 backup files. These N backup files are then forwarded to the location of the collator module 454 (block 910), and are received at the location at which the data is to be collated (e.g., the primary node). The collator module 454 (FIG. 4) may be located at one node (e.g., primary node), at the VIOS DB 140, the management console 175 or some other location within the system 100. As illustrated by FIG. 6B, the collator module 454 collates/gathers the N+1 backup files (block 912) and merges and compresses the N+1 files into a single compressed (zip) file, the cluster configuration backup file 650 (block 914). A copy of this cluster configuration backup file 650 is then placed on the shared repository 150 or the VIOS DB 140 (block 916) from where each VIOS is able to access the file and download a local copy thereof. Each VIOS may then download the file and place the copy within the local DB 440 of the respective VIOS (block 918). In one embodiment, the described collator module 454 is a component within cluster backup/restore utility 450/452 (FIG. 4). Also, in one embodiment, the merge/collate and compression function performed by the collator module is a zip function that generates a zipped file representative of the cluster configuration backup file 650. The method terminates at end block 920.

Figure 10:
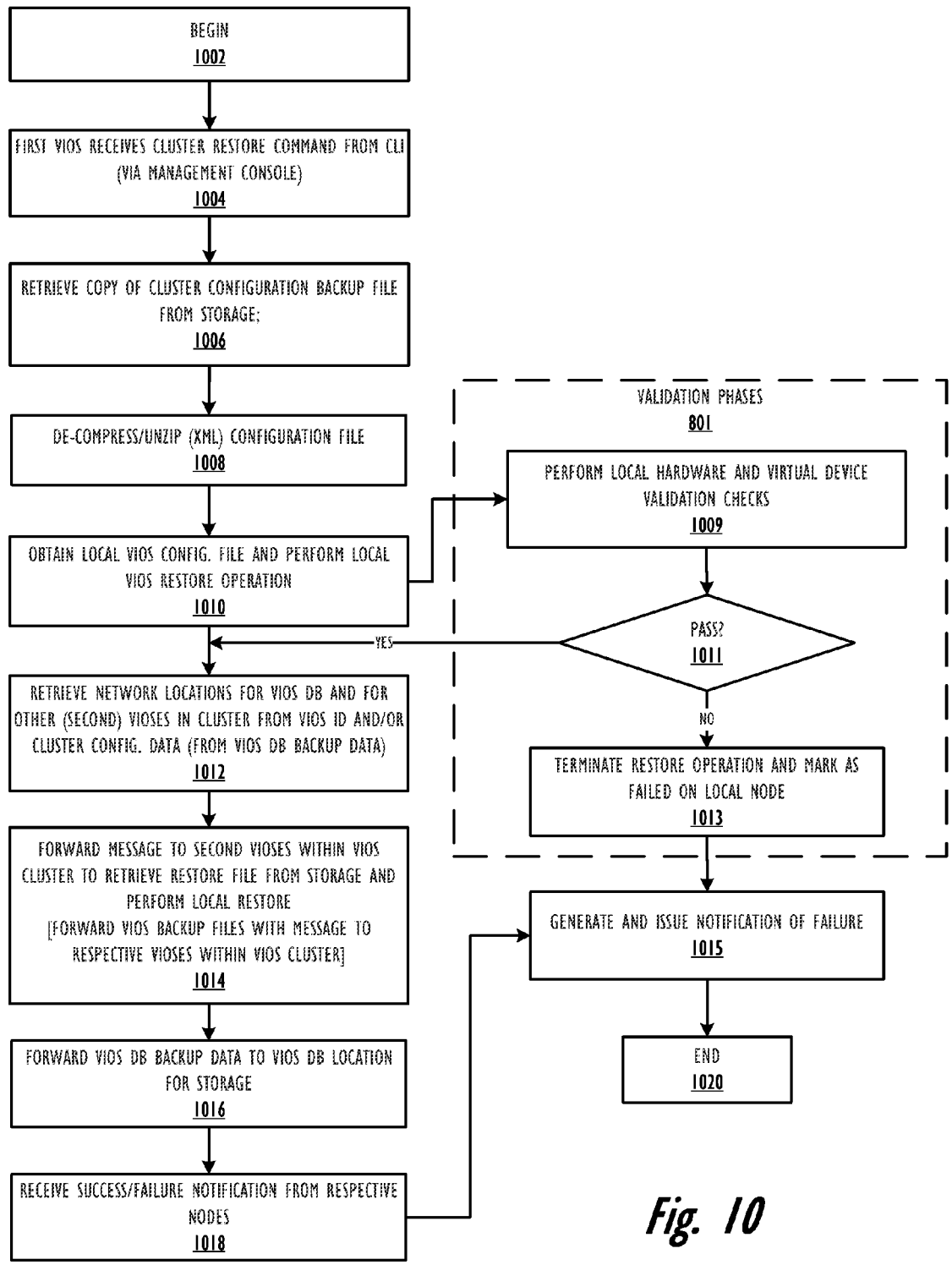
FIG. 10 is a high-level logical flowchart of an example method by which a VIOS cluster restore operation is completed by a CA_OS within a VIOS cluster, according to one or more embodiments.

With the single compressed/zipped file available to the different VIOSes either locally within the local DB 440 or on the distributed storage repository 150, the recovery of the VIOS cluster becomes a multi-level recovery operation. FIG. 10 illustrates one example of the method by which this cluster restore operation is performed, according to one or more embodiments. The method begins at initiation block 1002. In one embodiment, the cluster restore feature is triggered by the specific parameter that is entered along with the VBR command. In the illustrated embodiment, a cluster level restore (CBR) command is entered by the system administrator using the management console 175 or a local I/O access to the CEC. The CBR command is entered on the CLI 410 and is received by OS of the first (local) VIOS (block 1004). On receipt of the CBR command, the OS activates the backup/restore module 450 which then retrieves a copy of the cluster configuration backup file 650 from storage (block 1006). The cluster configuration backup file 650 may be retrieved from local storage (where each VIOS has a local copy of the file 650, which is generated during the cluster level backup operation described above), in one embodiment. In an alternate embodiment, the specific file may be retrieved from a different storage location (such as the distributed storage repository 150). However, with this alternate embodiment, the first VIOS may simply restore to the state using its local copy of its own VIOS backup file 600, since the first VIOS may need to configure itself for I/O operations before being able to access the different storage location.

Once the cluster configuration file is retrieved, the backup/restore module 450 unzips the (XML) file 650 (block 1008). The backup/restore module 450 unzips the file 650, which un-collates the various individual N+1 backup files. The backup/restore module 450 then performs a local restore operation to restore the VIOS to the correct backed up state (block 1010). As described above, the local restore process involves one or more validation phases 801, during which the backup/restore module 450 performs local hardware and virtual device validation checks (block 1009) and determines whether or not the validation checks pass (block 1011). When the validation checks fail, the backup/restore module 450 terminates the restore operation and marks the operation as failed on the local node (block 1013). The backup/restore module 450 also generates a notification to be sent to the system administrator (block 1015).

When the restore operation of the local node completes successfully, the backup/restore module 450 obtains the network locations of the respective second VIOSes of the cluster and of the VIOS DB (block 1012). This location information can be retrieved from the VIOS identifier (ID) or network or IP address associated with each second VIOS backup file and/or from the VIOS DB backup data file. The backup/restore module 450 then triggers the CM utility 222 (or other component of OS 220) to forward a restore message (with specific restore parameters identifying which specific configuration backup file is to be restored) to each VIOS (block 1014). In one alternate embodiment, where data corruption has occurred at the remote VIOSes, for example, the backup/restore module 450 may forward the respective copies of the second VIOS backup file to each second VIOS within the cluster. Thus, on receipt of the backup file and following verification that the specific file belongs to the receiving VIOS, each VIOS then restores its own state to the earlier state during which the backup file was initially generated.

The backup/restore module 450 also forwards the VIOS DB backup data to the VIOS DB 140 for restore and storage on the VIOS DB 140 (block 1016). In one embodiment, the backup/restore module 450 of the local VIOS at which the cluster backup was initiated re-creates the database by restoring the database components at a location that is shared with (and accessible to) the other VIOSes within the cluster. The restoration of the VIOS DB 140 ensures that the VIOS objects configuration information is available and that the cluster is operational.

In one embodiment, the backup/restore module 450 can receive a success/failure message from each second node, as a response to the trigger message to perform the restore operation (block 1018). When a failure is registered at any one of the second VIOSes or a timeout condition occurs (no receipt of a confirmation message within a pre-established time for receiving the confirmation from the second VIOS), the backup/restore module 450 generates and issues a notification of the specific failure recorded/detected with the cluster restore operation (block 1015). The cluster level restore operation then terminates at end block 1020.

As can be determined from the above description, embodiments may be provided by which the above functional features are applied to a single VIOS restoration when the VIOS crashes. This enables recovery of various nodes in a VIOS cluster when one or more of the nodes (but not the entire cluster) crashes. The above technique enables the restore of these faulty, corrupted, or crashed VIOSes once the cluster configuration data file 650 is available and accessible to either the crashed VIOS or to another VIOS within the VIOS cluster. In one embodiment, the VIOS restore command can be utilized to trigger the creation or modification of the VIOS objects for the corrupted node. With this embodiment, the CM utility 222 (or backup/restore utility 450) also modifies the VIOS DB 140 to reflect the correct state for the corrupted node. Once this process is completed, the backup/restore module 450 is run on the VIOS in order to restore the legacy VIOS configurations on the recovered node.

Thus, as described herein the various embodiments provide a method, data processing system and computer program product that enables backup and restore functionality of configuration data of a VIOS within a VIOS cluster as well as backup and restore functionality of configuration data of the entire VIOC cluster, including the VIOS DB 140. The method comprises the following functional features: performing, via a backup/restore utility of a cluster aware (CA) operating system (OS) executing on a processor resource of the first VIOS partition, a cluster level backup operation from one or more VIOS partitions, including the first VIOS partition and at least one second VIOS partition, wherein the cluster level backup operation creates a first VIOS cluster configuration backup file having configuration information about hardware, logical and virtual devices of each VIOS partition within a VIOS cluster and all cluster data from a shared VIOS database of the VIOS cluster; storing the VIOS cluster configuration backup file within a storage location; and responsive to receipt of a VIOS restore command at the first VIOS partition: retrieving the configuration backup file from the storage location; restoring a configuration of the hardware, logical and virtual devices of the first VIOS to a state that existed at a time at which the backup operation creating the configuration backup file was performed; triggering a restore operation of each second VIOS within the VIOS cluster; and restoring the shared VIOS database with the cluster data from the VIOS cluster configuration backup file.

In one or more of the embodiments, the method further comprises: receiving a first trigger at the CA OS that is associated with performing one or more of a backup and a restore operation; and in response to the first trigger being a received virtual cluster level backup/restore (CBR) command: parsing the received CBR command for a function parameter that indicates which operation is being requested; and performing the requested operation across the VIOS cluster.

Further, in one embodiment, the CBR command is received via a command line input from a management console communicatively connected to the first VIOS, and the method provides: in response to the first trigger being a cluster level backup request received at the OS via the CBR command, initiating the backup operation as a cluster level configuration backup operation; and in response to the first trigger being a cluster level restore request received at the OS via the CBR command: retrieving the VIOS cluster configuration backup file from the storage location; unzipping the VIOS cluster configuration backup file; performing the restoring and triggering operations to enable a restore of the configuration of the hardware, logical and virtual devices of the first VIOS and for each of the second VIOSes; and performing the restoring of the shared VIOS database.

In yet another embodiment, the method provides: in response to the first trigger being a cluster level backup scheduling timer reaching one or more of a time value and a date value, initiating the cluster level backup operation as an automated configuration backup operation; and in response to the first trigger being expiration of a timer having a count value since a previous cluster level backup operation has been performed: initiating the cluster level backup operation as an automated periodic cluster level configuration backup operation; and resetting the timer when the cluster level backup operation is completed.

In one or more embodiments, performing the cluster level backup operation from the first VIOS partition can comprises: performing a local configuration backup of configuration data of the first VIOS to generate a first XML configuration file; forwarding the first XML configuration file to a collating storage location; messaging each second VIOS within the VIOS cluster to perform a local configuration backup and to return a respective second XML configuration file to a single collating storage location; performing a complete backup of the shared VIOS database to generate a VIOS data base backup file; forwarding the VIOS database backup file to the collating storage location; generating the single VIOS cluster configuration backup file from the N XML configuration files of each VIOS within the VIOS cluster and the one (1) VIOS database backup file, wherein the generating comprises performing a zip operation to collate and compress the N XML configuration files and the VIOS database backup file into a single zip file; and storing the single zip file as the VIOS cluster configuration backup file. The storing of the VIOS cluster configuration backup file comprises one or more of: storing a local copy of the VIOS cluster configuration backup file at a local storage of the first VIOS; storing a local copy of the VIOS cluster configuration backup file at a local storage of each of the first VIOS and the one or more second VIOSes; and storing an exportable copy of the VIOS cluster configuration backup file at one or more of the shared storage repository and the VIOS database.

Finally, in one embodiment, the restoring further comprises: performing one or more local validation checks of one or more of the hardware, logical and virtual devices against the stored parameters within the configuration backup file of the first VIOS; receiving one or more messages indicating one of a successful completion and a failure of a local restore operation at each node of the VIOS cluster and at the shared VIOS database; in response to a validation check of one or more of the local validation checks failing: pausing a restore operation; and generating a notification of an error in the restore operation; and in response to receiving a failure response from one or more of a node of the VIOS cluster and the shared VIOS database, generating a notification of an error in the restore operation at a specific source of the failure response.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having a processor, a memory coupled to the processor, at least one input/output (I/O) adapter that enables connection to an external network with a shared storage repository, and a virtualization management component executing within the data processing system to generate a plurality of operating system (OS) partitions including a first virtual I/O server (VIOS) partition, a method comprising:

performing, via a backup/restore utility of a cluster aware (CA) operating system (OS) executing on a processor resource of the first VIOS partition, a cluster level backup operation from one or more VIOS partitions, including the first VIOS partition and at least one second VIOS partition, wherein the cluster level backup operation creates a first VIOS cluster configuration backup file having configuration information about hardware, logical and virtual devices of each VIOS partition within a VIOS cluster and all cluster data from a shared VIOS database of the VIOS cluster, and wherein performing the cluster level backup operation to create the first VIOS cluster configuration backup file when a maximum number of cluster configuration backup files for the first VIOS partition exists causes an oldest cluster configuration backup file for the first VIOS partition to be automatically removed;

storing the first VIOS cluster configuration backup file within a storage location, wherein the storing of the VIOS cluster configuration backup file comprises one or more of: storing a local copy of the VIOS cluster configuration backup file at a local storage of the first VIOS, storing a local copy of the VIOS cluster configuration backup file at a local storage of each of the first VIOS and the one or more second VIOSes, and storing an exportable copy of the VIOS cluster configuration backup file at one or more of the shared storage repository and the shared VIOS database; and in response to receiving a VIOS restore command at the first VIOS partition:
retrieving the configuration backup file from the storage location;
restoring a configuration of the hardware, logical and virtual devices of the first VIOS to a state that existed at a time at which the backup operation creating the configuration backup file was performed;
triggering a restore operation of each second VIOS within the VIOS cluster; and
restoring the shared VIOS database with the cluster data from the VIOS cluster configuration backup file.

2. The method of claim 1, further comprising:
receiving a first trigger at the CA OS that is associated with performing one or more of a backup operation and a restore operation; and
in response to the first trigger being a received virtual cluster level backup/restore (CBR) command:
parsing the received CBR command for a function parameter that indicates an operation being requested; and
performing the requested operation across the VIOS cluster.

3. The method of claim 2, wherein:
the CBR command is received via a command line input from a management console communicatively connected to the first VIOS; and
the method further comprises:
in response to the first trigger being a cluster level backup request received at the CA OS via the CBR command, initiating the backup operation as a cluster level configuration backup operation; and
in response to the first trigger being a cluster level restore request received at the CA OS via the CBR command:
retrieving the VIOS cluster configuration backup file from the storage location;
unzipping the VIOS cluster configuration backup file;
performing the restoring and triggering operations to enable a restore of the configuration of the hardware, logical and virtual devices of the first VIOS and for each second VIOS within the VIOS cluster; and performing the restoring of the shared VIOS database.

4. The method of claim 2, further comprising:

in response to the first trigger being a cluster level backup scheduling timer reaching one or more of a time value and a date value, initiating the cluster level backup operation as an automated configuration backup operation; and in response to the first trigger being an expiration of a timer having a count value since a previous cluster level backup operation has been performed:
 initiating the cluster level backup operation as an automated periodic cluster level configuration backup operation; and
 in response to the cluster level backup operation completing, resetting the timer.

5. The method of claim 1, wherein performing the cluster level backup operation from the first VIOS partition further comprises:

performing a local configuration backup of configuration data of the first VIOS to generate a first XML configuration file;

forwarding the first XML configuration file to a collating storage location;

messaging each second VIOS within the VIOS cluster to perform a local configuration backup and to return a respective second XML configuration file to a single collating storage location;

performing a complete backup of the shared VIOS database to generate a VIOS data base backup file;

forwarding the VIOS database backup file to the collating storage location;

generating the single VIOS cluster configuration backup file from the XML configuration files of each VIOS within the VIOS cluster and the one VIOS database backup file, wherein the generating comprises performing a zip operation to collate and compress the XML configuration files of each VIOS within the VIOS cluster and the VIOS database backup file into a single zip file; and storing the single zip file as the VIOS cluster configuration backup file.

6. In a data processing system having a processor, a memory coupled to the processor, at least one input/output (I/O) adapter that enables connection to an external network with a shared storage repository, and a virtualization management component executing within the data processing system to generate a plurality of operating system (OS) partitions including a first virtual I/O server (VIOS) partition, a method comprising:

performing, via a backup/restore utility of a cluster aware (CA) operating system (OS) executing on a processor resource of the first VIOS partition, a cluster level backup operation from one or more VIOS partitions, including the first VIOS partition and at least one second VIOS partition, wherein the cluster level backup operation creates a first VIOS cluster configuration backup file having configuration information about hardware, logical and virtual devices of each VIOS partition within a VIOS cluster and all cluster data from a shared VIOS database of the VIOS cluster, and wherein performing the cluster level backup operation to create the first VIOS cluster configuration backup file when a maximum number of cluster configuration backup files for the first VIOS partition exists causes an oldest cluster configuration backup file for the first VIOS partition to be automatically removed;

storing the first VIOS cluster configuration backup file within a storage location; and in response to receiving a VIOS restore command at the first VIOS partition:
 retrieving the configuration backup file from the storage location;
 restoring a configuration of the hardware, logical and virtual devices of the first VIOS to a state that existed at a time at which the backup operation creating the configuration backup file was performed;
 triggering a restore operation of each second VIOS within the VIOS cluster; and
 restoring the shared VIOS database with the cluster data from the VIOS cluster configuration backup file, wherein said restoring further comprises:
  performing one or more local validation checks of one or more of the hardware, logical and virtual devices against the stored parameters within the configuration backup file of the first VIOS;
  receiving one or more messages indicating one of a successful completion and a failure of a local restore operation at each node of the VIOS cluster and at the shared VIOS database;
  in response to a validation check of one or more of the local validation checks failing:
   pausing a restore operation; and
   generating a notification of an error in the restore operation; and
  in response to receiving a failure response from one or more of a node of the VIOS cluster and the shared VIOS database, generating a notification of an error in the restore operation at a specific source of the failure response.

7. In a data processing system having a processor, a memory coupled to the processor, at least one input/output (I/O) adapter that enables connection to an external network with a shared storage repository, and a virtualization management component executing within the data processing system to generate a plurality of operating system (OS) partitions including a first virtual I/O server (VIOS) partition, a method comprising:

receiving a first trigger at the CA OS that is associated with performing one or more of a backup operation and a restore operation;

in response to the first trigger being a received virtual cluster level backup/restore (CBR) command:
 parsing the received CBR command for a function parameter that indicates an operation being requested; and
 performing the requested operation across the VIOS cluster;

performing, via a backup/restore utility of a cluster aware (CA) operating system (OS) executing on a processor resource of the first VIOS partition, a cluster level backup operation from one or more VIOS partitions, including the first VIOS partition and at least one second VIOS partition, wherein the cluster level backup operation creates a first VIOS cluster configuration backup file having configuration information about hardware, logical and virtual devices of each VIOS partition within a VIOS cluster and all cluster data from a shared VIOS database of the VIOS cluster, and wherein performing the cluster level backup operation to create the first VIOS cluster configuration backup file when a maximum number of cluster configuration backup files for the first VIOS partition exists causes an oldest cluster configuration backup file for the first VIOS partition to be automatically removed, wherein performing the cluster level backup operation further comprises:
receiving a VIOS backup/restore (VBR) command;
determining, from the VBR command, the maximum number of cluster configuration backup files that are storable within the storage location for the first VIOS partition; and
in response to receiving the first trigger and determining the maximum number of cluster configuration backup files within the storage location for the first VIOS partition has been reached, automatically removing the oldest cluster configuration backup file of one or more cluster configuration backup files for the first VIOS partition;
storing the first VIOS cluster configuration backup file within a storage location; and
in response to receiving a VIOS restore command at the first VIOS partition:
retrieving the configuration backup file from the storage location;
restoring a configuration of the hardware, logical and virtual devices of the first VIOS to a state that existed at a time at which the backup operation creating the configuration backup file was performed;
triggering a restore operation of each second VIOS within the VIOS cluster; and
restoring the shared VIOS database with the cluster data from the VIOS cluster configuration backup file.

\* \* \* \* \*